United States Patent
Toyota et al.

(10) Patent No.: US 10,232,904 B2
(45) Date of Patent: Mar. 19, 2019

(54) LEANING VEHICLE

(71) Applicant: YAMAHA HATSUDOKI KABUSHIKI KAISHA, Iwata-shi, Shizuoka (JP)

(72) Inventors: Takeshi Toyota, Shizuoka (JP); Nobuo Hara, Shizuoka (JP); Yukihide Fukuhara, Shizuoka (JP); Tatsuya Nagata, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 23 days.

(21) Appl. No.: 15/568,490

(22) PCT Filed: Apr. 27, 2016

(86) PCT No.: PCT/JP2016/063284
§ 371 (c)(1),
(2) Date: Oct. 23, 2017

(87) PCT Pub. No.: WO2016/175263
PCT Pub. Date: Nov. 3, 2016

(65) Prior Publication Data
US 2018/0154974 A1 Jun. 7, 2018

(30) Foreign Application Priority Data
Apr. 28, 2015 (JP) .................. 2015-091799

(51) Int. Cl.
B62K 21/08 (2006.01)
B62K 21/18 (2006.01)
(Continued)

(52) U.S. Cl.
CPC .............. B62K 21/18 (2013.01); B62J 99/00 (2013.01); B62K 21/00 (2013.01); B62K 21/06 (2013.01);
(Continued)

(58) Field of Classification Search
CPC .................. B62J 99/00; B62J 2099/002; B62J 2099/004; B62K 21/00; B62K 21/06; B62K 21/18
(Continued)

(56) References Cited

U.S. PATENT DOCUMENTS

2008/0315550 A1* 12/2008 Parker ................... B62K 21/00
280/276
2011/0239786 A1 10/2011 Tsuda et al.
(Continued)

FOREIGN PATENT DOCUMENTS

CN 203111409 U 8/2013
EP 1 248 013 A2 10/2002
(Continued)

OTHER PUBLICATIONS

Official Communication issued in International Patent Application No. PCT/JP2016/063284, dated Jul. 26, 2016.
(Continued)

Primary Examiner — Toan C To
(74) Attorney, Agent, or Firm — Keating & Bennett, LLP

(57) ABSTRACT

A leaning vehicle includes a body frame including a headpipe, a front wheel, a steering torque transmission including a steering shaft supported by bearings, a handlebar assembly, and a front wheel connector that transmits a steering torque, and a steering torque detector. The steering torque transmission includes a torsional deformation element upstream of a portion of the steering shaft supported by the most upstream bearing in a steering torque transmission path, and which is easily twisted and deformed by a steering torque input from grips on the handlebar assembly. The steering torque detector detects at least a portion of the steering torque input into the steering torque transmission based on a torsional deformation of the torsional deformation element.

11 Claims, 9 Drawing Sheets

(51) Int. Cl.
  *B62J 99/00* (2009.01)
  *B62K 21/00* (2006.01)
  *B62K 21/06* (2006.01)
(52) U.S. Cl.
  CPC .... *B62J 2099/002* (2013.01); *B62J 2099/004* (2013.01)
(58) Field of Classification Search
  USPC ........................................ 280/271, 272, 779
  See application file for complete search history.

(56) References Cited

U.S. PATENT DOCUMENTS

| | | | |
|---|---|---|---|
| 2012/0083973 A1* | 4/2012 | Araki | B62K 21/00 701/43 |
| 2013/0024137 A1 | 1/2013 | Grassi | |
| 2015/0251722 A1* | 9/2015 | Watanabe | B62K 21/08 280/272 |
| 2015/0274160 A1* | 10/2015 | Lee | B62D 6/002 701/41 |
| 2016/0280192 A1* | 9/2016 | Seto | B60T 8/1706 |
| 2016/0280307 A1* | 9/2016 | Takenaka | B62K 21/00 |
| 2016/0375948 A1* | 12/2016 | Takenaka | B62K 5/10 280/5.506 |
| 2017/0088229 A1* | 3/2017 | Mori | B62D 5/04 |
| 2018/0154974 A1* | 6/2018 | Toyota | B62J 99/00 |
| 2018/0265117 A1* | 9/2018 | Hara | B62D 5/046 |

FOREIGN PATENT DOCUMENTS

| | | |
|---|---|---|
| JP | 2008-068734 A | 3/2008 |
| JP | 2011-046273 A | 3/2011 |
| JP | 2011-073619 A | 4/2011 |
| JP | 2011-213155 A | 10/2011 |
| JP | 2012-017042 A | 1/2012 |
| JP | 2012-76490 A | 4/2012 |
| JP | 2012-76502 A | 4/2012 |
| JP | 2012-76511 A | 4/2012 |
| JP | 2012-181057 A | 9/2012 |
| JP | 5383388 B2 | 1/2014 |
| JP | 2014-91506 A | 5/2014 |
| JP | 2014-521105 A | 8/2014 |

OTHER PUBLICATIONS

Official Communication issued in corresponding European Patent Application No. 16786539.3, dated Apr. 23, 2018.

* cited by examiner

LEANING VEHICLE

BACKGROUND OF THE INVENTION

1. Field of the Invention

The present invention relates to leaning vehicles each including a body frame which includes a headpipe which is provided at a center of the vehicle in a left-and-right direction thereof and which leans to the right in the left-and-right direction thereof when the vehicle turns right and turns to the left in the left-and-right direction thereof when the vehicle turns left.

2. Description of the Related Art

Japanese Patent No. 5383388 discloses a leaning vehicle having a body frame which includes a headpipe which is provided at a center of the vehicle in a left-and-right direction thereof and which leans to the right of the vehicle in the left-and-right direction when the vehicle turns right and turns to the left of the vehicle in the left-and-right direction when the vehicle turns left. The leaning vehicle described in Japanese Patent No. 5383388 has an electric power steering system (EPS) and a steering torque sensor for detecting steering torque. This leaning vehicle has a steering torque transmission path which includes members such as, for example, a handlebar which includes a right grip and a left grip, a steering shaft to which the handlebar is fixed, and suspensions where a front wheel is supported which are arranged in that order from an upstream side to a downstream side of a path for transmitting steering torque.

When a rider inputs a steering force into the grips, a steering torque is transmitted to the front wheel via the steering torque transmission path. The steering torque is transmitted to the front wheel while the members making up the steering torque transmission path are being twisted. In the leaning vehicle described in Japanese Patent No. 5383388, a steering torque sensor for detecting a twist which is generated according to the steering torque is provided somewhere along the steering torque transmission path. By using this structure, the leaning vehicle described in Japanese Patent No. 5383388 detects a steering torque to control the EPS according to the steering torque.

SUMMARY OF THE INVENTION

The inventor of preferred embodiments of the present invention has discovered that the leaning vehicle described in Japanese Patent No. 5383388 tends to have insufficient rigidity to support the steering shaft. In a case in which a member which supports the steering shaft is simply enlarged in size, although the supporting rigidity is enhanced, the size of the vehicle is enlarged.

Thus, preferred embodiments of the present invention provide leaning vehicles including a steering torque sensor which has a high rigidity against bending and which is significantly reduced or prevented from being enlarged in size.

According to a preferred embodiment of the present invention, a leaning vehicle includes a body frame including a headpipe provided at a center of the vehicle in a left-and-right direction thereof and which leans to a right in the left-and-right direction when the vehicle turns right and leans to a left in the left-and-right direction when the vehicle turns left; a front wheel suspended on the body frame and that is able to turned in the left-and-right direction; a steering torque transmission including a handlebar assembly and a front wheel connector that mechanically transmit a steering torque input into the handlebar assembly to the front wheel, the handlebar assembly including a steering shaft supported on the headpipe via a plurality of bearings so as to turn within a rotational angle range smaller than 180 degrees but turn within a rotational angle range of equal to or greater than 180 degrees, and having a turning axis provided at the center of the vehicle in the left-and-right direction and extending along an up-and-down direction of the vehicle; a right grip provided to the right of the center of the vehicle in the left-and-right direction thereof for a rider to grip; and a left grip provided to the left of the center of the vehicle in the left-and-right direction thereof for the rider to grip; wherein the front wheel connector connects the steering shaft and the front wheel together; a steering torque detector that detects at least a portion of a steering torque that is input into the steering torque transmission; wherein the steering torque transmission includes a torsional deformation element located upstream of a portion of the steering shaft supported by a most upstream bearing of the plurality of bearings in a steering torque transmission path, and which extends from the right grip or the left grip to the front wheel and is easily twisted and deformed by a steering torque input from the right grip or the left grip; and the steering torque detector detects at least a portion of the steering torque input into the steering torque transmission based on a torsional deformation of the torsional deformation element.

The inventor has discovered that a leaning vehicle as described in Japanese Patent No. 5383388 tends to have insufficient rigidity to support the steering shaft. In a case in which an element which supports the steering shaft is enlarged simply in size, although the rigidity is enhanced, the size of the vehicle is enlarged. This problem will be described in detail below.

The leaning vehicle described in Japanese Patent No. 5383388 has a steering shaft which transmits a steering torque which is input from the right grip and the left grip to the front wheel. The handlebar which includes the right grip and the left grip is provided at an upper portion of the vehicle. The front wheel is provided at a lower portion of the vehicle. Due to this, the steering shaft extends in an up-and-down direction of the body frame.

When the rider inputs a steering force into the right grip and the left grip, the steering shaft is twisted according to a steering torque generated then. The steering sensor detects an amount of twisting generated in the steering shaft. A torsional deformation element is provided in the steering shaft, and this torsional deformation element has a lower rigidity than that of the other portions thereof so as to be twisted easier. The steering torque sensor detects the amount of twisting generated in the torsional deformation element.

Different from the vehicle disclosed in Japanese Patent No. 5383388, in a case in which the torque sensor monitors a portion of the steering shaft which has a higher rigidity so as to be deformed with difficulty, the steering torque sensor has difficulty in detecting a steering torque with high accuracy. In the event that there is a portion which has a lower rigidity in the steering torque transmission path, the portion having the lower rigidity is twisted greatly, while the portion having the higher rigidity which is monitored by the steering torque sensor has difficulty in being deformed, making it difficult for the steering torque sensor to detect the steering torque with high accuracy. From these reasons, with the leaning vehicle of Japanese Patent No. 5383388, the steering torque is able to be detected with high accuracy.

Incidentally, the steering shaft of the leaning vehicle of Japanese Patent No. 5383388 is supported on a headpipe with a plurality of bearings so as to turn therein. Different from the leaning vehicle disclosed in Japanese Patent No. 5383388, in the event that the steering shaft is attempted to be supported by a single bearing, a great force is applied to the bearing, and therefore, a large bearing that withstands the great force is needed.

By using the structure described above, with the leaning vehicle disclosed in Japanese Patent No. 5383388, the steering torque is detected with a high accuracy while ensuring the required rigidity. However, the inventor has discovered that a vehicle as described in Japanese Patent No. 5383388 tends to have insufficient rigidity to support the steering shaft, as will be described below when taking into consideration a bending force which is applied to the steering shaft.

In addition to the twist caused by the steering torque, a bending force is applied to the steering shaft. For example, when a front wheel is displaced in a front-and-rear direction, a bending force is applied to the steering shaft. When the front wheel is displaced in the front-and-rear direction, since a force acting in the front-and-rear direction is applied to a lower portion of the steering shaft, the lower portion of the steering shaft is displaced more than a portion of the steering shaft which is located above the lower portion. When the bending force is applied to the steering shaft on which the torsional deformation element is provided, although a portion located below the torsional deformation element is deformed greatly, a portion located above the torsional deformation element has difficulty in being deformed.

A description will be made by taking as an example a case in which the steering shaft is supported so as to turn by an upper bearing and a lower bearing which is provided below the upper bearing. Imagine a case where a bending force is applied to a lower portion of the steering shaft described above. In a case where the torsional deformation element that detects a steering torque is provided below a lower bearing, the bending force is concentrated on the torsional deformation element, such that the torsional deformation element is deformed greatly. Then, it is considered to increase a diameter of the torsional deformation element so as to ensure a rigidity against the bending force at the torsional deformation element. However, when the diameter of the torsional deformation element is increased, with the intent to detect the steering torque with high accuracy, the rigidity of the other portion of the steering shaft needs to be increased higher than that of the torsional deformation element. Due to this, in the event that the torsional deformation element is provided below the lower bearing, the size of the steering shaft is increased.

A different structure is considered in which the torsional deformation element is provided between the upper bearing and the lower bearing. In this structure too, however, stress is concentrated on the torsional deformation element when a bending force is applied to the steering shaft. As a result, in the steering shaft, the portion located below the torsional deformation element is deformed greater than the portion located above the torsional deformation element. Then, the bending force supported by the upper bearing which is located above the torsional deformation element is reduced, while the bending force supported by the lower bearing which is located below the torsional deformation element is increased by such an extent that the bending force supported by the upper bearing is reduced. Due to this, in order to increase the supporting rigidity of the lower bearing, the size of the lower bearing is increased, or in order to increase the rigidity of the torsional deformation element, the size of the other portion of the steering shaft is increased. This increases the size of the steering shaft as a whole.

In the description made above, although the steering shaft is described as being supported by the upper bearing and the lower bearing, the same effects will result even when one or more bearings are provided between the upper bearing and the lower bearing.

In the description made above, although the torsional deformation element is described as being provided on the steering shaft, this problem remains the same even when the torsional deformation element is provided on an element other than the steering shaft in the steering torque transmission path. It is considered that the torsional deformation element is provided on an element located on a downstream side of the steering torque transmission path, for example, an element which connects the steering shaft and the suspensions together. Even with this structure, however, when attempting to ensure a great rigidity of the torsional deformation element which is provided on that element, in order to detect an amount of displacement thereof, the rigidity of the other element such as the steering shaft needs to be ensured, thus increasing the size of the other element.

The inventor has noticed that the size of the vehicle is increased when attempting to ensure a great supporting rigidity and to ensure a great accuracy for the steering torque sensor in which the torsional deformation element is provided halfway along the steering torque transmission path in the manner described above.

Then, the steering torque transmissions of the leaning vehicles according to preferred embodiments of the present invention include the torsional deformation element that is easily deformed by a steering torque input from the right grip or the left grip. This torsional deformation element is located upstream of the portion of the steering shaft that is supported by the most upstream bearing of the plurality of bearings in the steering torque transmission path, and extends from the right grip or the left grip to the front wheel and at the center of the vehicle in the left-and-right direction or laterally symmetrical with respect to the center of the vehicle. By using this structure, even though a bending force is applied to the portion of the steering torque transmission path from the front wheel side, the bending force is supported efficiently by all the bearings such that an enlargement in the size of the leaning vehicle is significantly reduced or prevented.

According to preferred embodiments of the present invention, even though a bending force is applied to a portion of the steering torque transmission path, since the bending force applied is supported by all the bearings, it is difficult for the bending force to be applied to the torsional deformation element provided on the upstream side of the portion of the steering shaft that is supported by the upstream bearing. This eliminates the necessity of enhancing the rigidity of the torsional deformation element, and the rigidity of the other portion of the steering shaft does not have to be increased more than required. This significantly reduces or prevents the enlargement in the size of the leaning vehicle.

In a leaning vehicle according to a preferred embodiment of the present invention described above, the torsional deformation element may be provided on the handlebar assembly.

In a leaning vehicle according to a preferred embodiment of the present invention described above, the handlebar assembly may include a handlebar and a handlebar connector which connects the handlebar to the steering shaft or to the front wheel connector, and the torsional deformation element may be provided on the handlebar.

In a leaning vehicle according to a preferred embodiment of the present invention described above, the handlebar assembly may include a handlebar and a handlebar connector which connects the handlebar to the steering shaft or to the front wheel connector, and the torsional deformation element may be provided on the handlebar connector.

In a leaning vehicle according to a preferred embodiment of the present invention described above, the torsional deformation element may be provided on the steering shaft.

In a leaning vehicle according to a preferred embodiment of the present invention described above, the steering torque detector may be provided on the handlebar assembly.

In a leaning vehicle according to a preferred embodiment of the present invention described above, the handlebar assembly may include a handlebar and a handlebar connector which connects the handlebar to the steering shaft or to the front wheel connector, and the steering torque detector may be provided on the handlebar.

In a leaning vehicle according to a preferred embodiment of the present invention described above, the handlebar assembly may include a handlebar and a handlebar connector which connects the handlebar to the steering shaft or to the front wheel connector, and the steering torque detector may be provided on the handlebar connector.

In a leaning vehicle according to a preferred embodiment of the present invention described above, the steering torque detector may be provided on the body frame.

In a leaning vehicle according to a preferred embodiment of the present invention described above, a motor that inputs an assisting steering torque to the steering torque transmission may be provided.

In a leaning vehicle according to a preferred embodiment of the present invention described above, the motor inputs the assisting steering torque to an element in the steering torque transmission path downstream of a portion of the steering shaft which is supported by an upstream bearing that is the most upstream of the plurality of bearings in the steering torque transmission path which extends from the handlebar assembly to the front wheel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
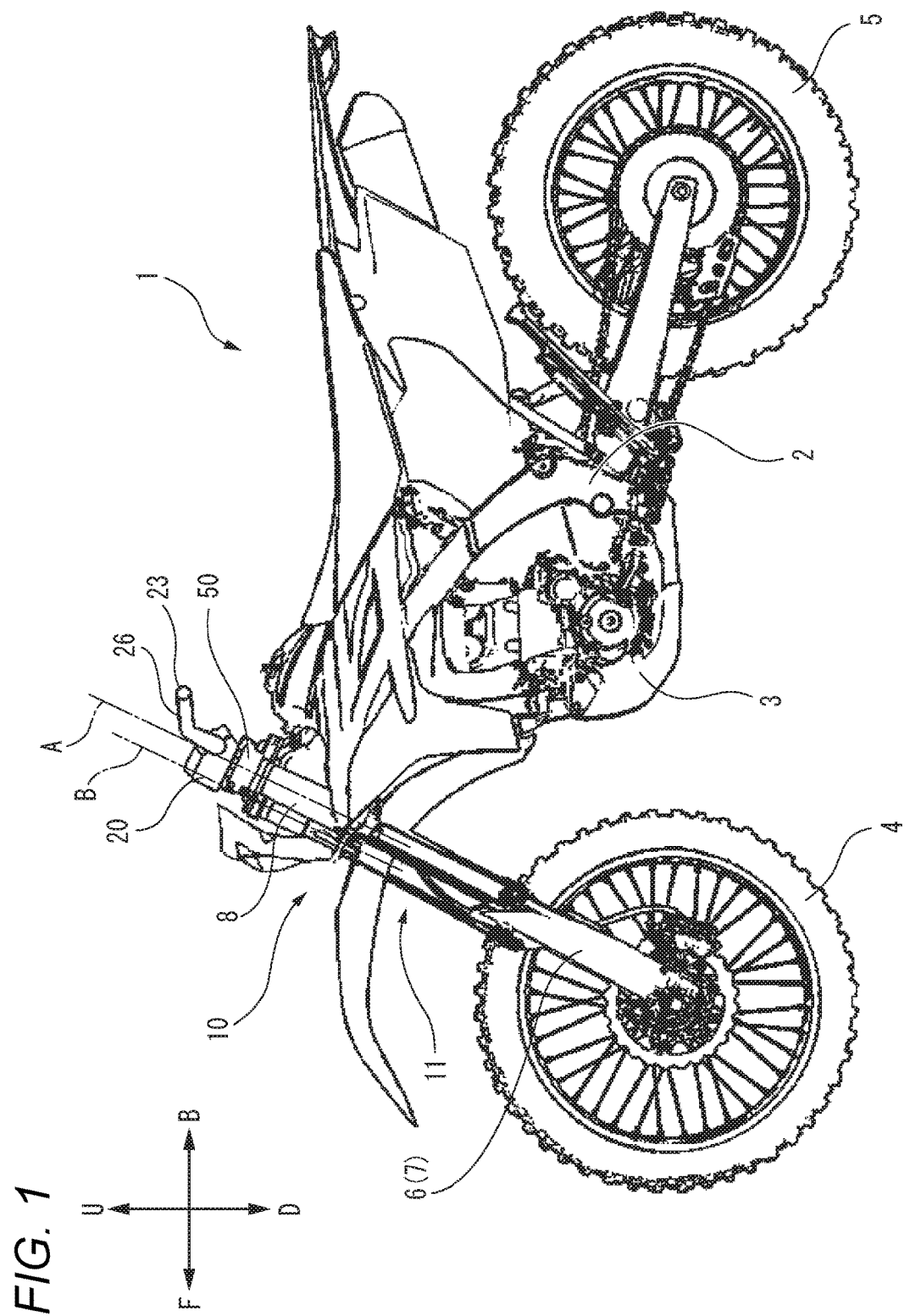
FIG. 1 is a side view of a leaning vehicle according to a preferred embodiment of the present invention.

Referring to the accompanying drawings, preferred embodiments of the present invention will be described in detail below.

In the accompanying drawings, an arrow F denotes forward of a vehicle which stands upright and which is not steered. An arrow B denotes rearward of the vehicle. An arrow U denotes above the vehicle. An arrow D denotes below the vehicle. An arrow R denotes the right of the vehicle. An arrow L denotes the left of the vehicle. An up-and-down direction of the vehicle coincides with a perpendicular direction.

In this description, a "front-and-rear direction," a "left-and-right direction" and the "up-and-down direction" refer to a front-and-rear direction, a left-and-right direction and an up-and-down direction, respectively, which are based on a body frame as viewed from a rider who drives the vehicle.

In this description, an expression reading something like "extending in the front-and-rear direction" includes extending while being inclined relative to the front-and-rear direction and means extending while being inclined in the front-and-rear direction rather than in the left-and-right direction and in the up-and-down direction.

In this description, an expression reading something like "extending in the left-and-right direction" includes extending while being inclined relative to the left-and-right direction and means extending while being inclined in the left-and-right direction rather than in the front-and-rear direction and in the up-and-down direction.

In this description, an expression reading something like "extending in the up-and-down" includes extending while being inclined relative to the up-and-down direction and means extending while being inclined in the up-and-down rather than in the front-and-rear direction and in the left-and-right direction.

In this description, an expression reading something like "directly on the left of an element A in the left-and-right direction" denotes a space through which the element A passes when the element A is moved to the left in the left-and-right direction. An expression reading something like "directly on the right of the element A in the left-and-right direction" is also defined in the same way.

In this description, an expression reading something like "on the left of the element A in the left-and-right direction" includes the space through which the element A passes when the element A is moved to the left in the left-and-right direction and also a space which extends from the space in a direction which is at right or substantially right angles to the left-and-right direction. An expression reading something like "on the right of the element A in the left-and-right direction" is defined in the same way.

In this description, an expression reading something like "directly above the element A in the up-and-down direction" denotes a space through which the element A passes when the element A is moved upwards in the up-and-down direction. An expression reading something like "directly below the element A in the up-and-down direction" is defined in the same way.

In this description, an expression reading something like "above the element A in the up-and-down direction" includes the space through which the element A passes when the element A is moved upwards in the up-and-down direction and also a space which extends from the space in a direction which is at right angles to the up-and-down direction. An expression reading something like "below the element A in the up-and-down direction" is defined in the same way.

In this description, an expression reading something like "directly ahead of the element A in the front-and-rear direction" denotes a space through which the element A passes when the element A is moved forwards in the front-and-rear direction. An expression reading something like "directly behind the element A in the front-and-rear direction" is defined in the same way.

In this description, an expression reading something like "ahead of the element A in the front-and-rear direction" includes the space through which the element A passes when the element A is moved forwards in the front-and-rear direction and also a space which extends from the space in a direction which is at right or substantially right angles to the front-and-rear direction. An expression reading something like "behind the element A in the front-and-rear direction" is defined in the same way.

First Preferred Embodiment

FIG. 1 is a side view of a leaning vehicle (hereinafter, referred simply to as a vehicle) 1 according to a first preferred embodiment of the present invention. In the present preferred embodiment, the vehicle 1 preferably is a motorcycle, for example. As shown in FIG. 1, the vehicle 1 includes a body frame 2, an engine 3, a front wheel 4 and a rear wheel 5. The rear wheel 5 is driven by the engine 3. The vehicle 1 is a leaning vehicle including the body frame 2 which leans to the right of the vehicle 1 in a left-and-right direction thereof when the vehicle 1 turns right and leans to the left of the vehicle 1 in the left-and-right direction thereof when the vehicle 1 turns left.

Figure 2:
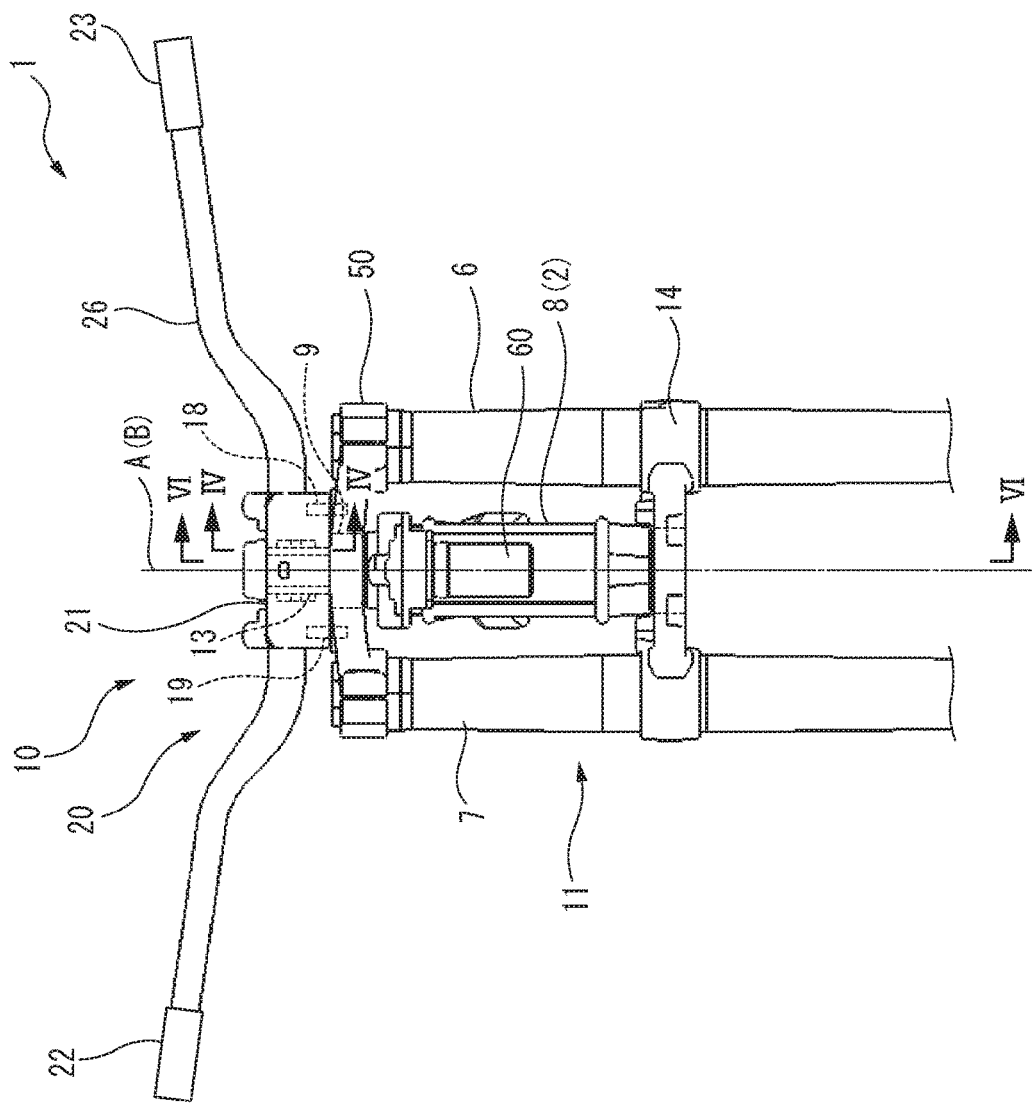
FIG. 2 is a front view showing a portion of the leaning vehicle shown in FIG. 1.

FIG. 2 is a front view showing a portion of the vehicle 1 shown in FIG. 1. As shown in FIG. 2, the body frame 2 includes a headpipe 8 which supports a steering shaft 9 so as to turn therein. The headpipe 8 is located substantially at a center of the vehicle 1 in the left-and-right direction. The headpipe 8 extends in a direction which follows an up-and-down direction of the vehicle 1. The headpipe 8 leans to the right of the vehicle 1 in the left-and-right direction thereof when the vehicle 1 turns right and leans to the left of the vehicle 1 in the left-and-right direction thereof when the vehicle 1 turns left.

The front wheel 4 is suspended on the body frame 2. The front wheel 4 is able to be steered in the left-and-right direction of the vehicle 1.

The vehicle 1 includes a steering torque transmission 10. The steering torque transmission 10 includes a steering shaft 9, a handlebar assembly 20, and a front wheel connector 11 which connects the steering shaft 9 and the front wheel 4 together. The steering torque transmission 10 mechanically transmits a steering torque which is input into the handlebar assembly 20 to the front wheel 4.

Figure 6:
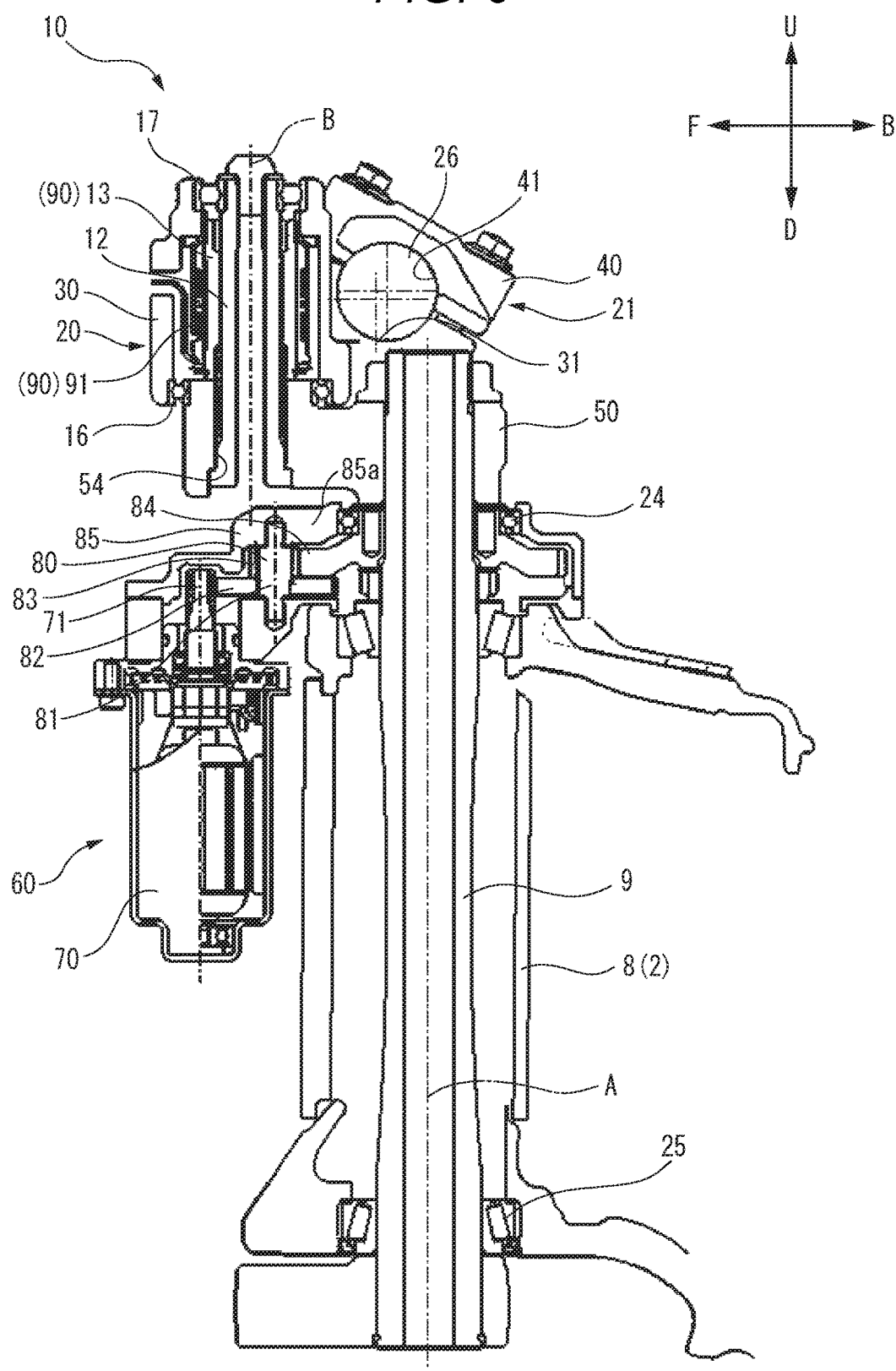
FIG. 6 is a sectional view taken along a line VI-VI in FIG. 2.

The steering shaft 9 is supported on the headpipe 8 via a plurality of bearings 24, 25 (refer to FIG. 6). The steering shaft 9 is able to turn about a steering axis A which extends along the up-and-down direction of the vehicle 1 within a rotational angle range smaller than 180 degrees but cannot turn within a rotational angle range equal to or greater than 180 degrees. The steering shaft 9 is provided, with the vehicle 1 standing upright, at a center of the vehicle 1 in the left-and-right direction thereof with the steering axis A extending along the up-and-down direction of the vehicle 1.

The front wheel connector 11 includes a top bridge 50, a bottom bridge 14, a right suspension 7 and a left suspension 6.

With the vehicle 1 standing upright, the right suspension 7 is provided on the right of the headpipe 8. With the vehicle 1 standing upright, the left suspension 6 is provided on the left of the headpipe 8. The right suspension 7 and the left suspension 6 extend along the up-and-down direction of the vehicle 1. A lower portion of the right suspension 7 and a lower portion of the left suspension 6 support the front wheel 4 so as to rotate about an axle axis which extends in the left-and-right direction of the vehicle 1. The right suspension 7 and the left suspension 6 support the front wheel 4 so as to be displaced in the up-and-down direction relative to the body frame 2.

The top bridge 50 is fixed to an upper portion of the steering shaft 9. The top bridge 50 is located above the headpipe 8 in the up-and-down direction of the vehicle 1. The top bridge 50 extends in the left-and-right direction of the vehicle 1. A right portion of the top bridge 50 fixes an upper portion of the right suspension 7. A left portion of the top bridge 50 fixes an upper portion of the left suspension 6. A middle portion of the top bridge 50 in the left-and-right direction is fixed to the steering shaft 9.

Figure 3:
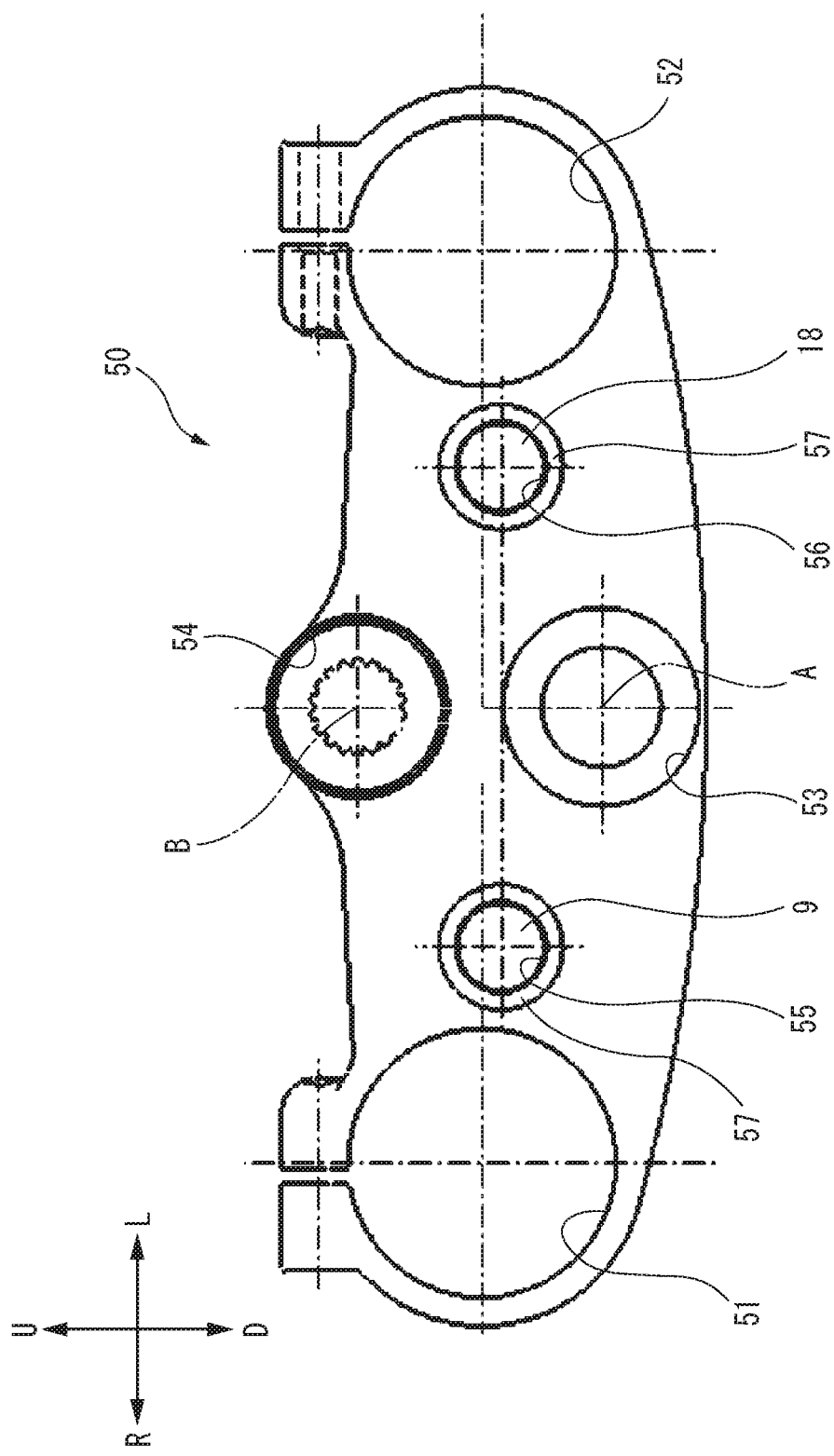
FIG. 3 is a top view of a top bridge.

FIG. 3 is a top view of the top bridge 50. As shown in FIG. 3, a left supporting hole 51 is provided in the left portion of the top bridge 50 so that an upper portion of the left suspension 6 is fit into the left supporting hole 51. A right supporting hole 52 is provided in the right portion of the top bridge 50 so that an upper portion of the right suspension 7 is fit into the right supporting hole 52.

A rear supporting hole 53 is provided in a position located at a central portion of the top bridge 50 in the left-and-right direction thereof and at a rear portion of the top bridge 50 so that the upper portion of the steering shaft 9 is fit into the rear supporting hole 53. A front supporting hole 54 is provided in a position located at the central portion of the top bridge 50 in the left-and-right direction thereof and directly ahead of the rear supporting hole 53. Spline grooves are provided on an inner circumferential surface of the front supporting hole 54.

Returning to FIG. 2, the bottom bridge 14 is fixed to a lower portion of the steering shaft 9. The bottom bridge 14 is located below the top bridge 50 in the up-and-down direction of the vehicle 1. The bottom bridge 14 is located below the headpipe 8 in the up-and-down direction of the vehicle 1. The bottom bridge 14 extends in the left-and-right direction of the vehicle 1. A right portion of the bottom bridge 14 fixes a middle portion of the right suspension 7 in the up-and-down direction thereof. A left portion of the bottom bridge 14 fixes a middle portion of the left suspension 6 in the up-and-down direction thereof. A middle portion of the top bridge 50 in the left-and-right direction is fixed to the steering shaft 9.

The handlebar assembly 20 includes a group of elements connected directly or indirectly to the steering shaft 9. The handlebar assembly 20 includes a right grip 22 and a left grip 23. The right grip 22 is gripped by a rider and is provided on the right of the center of the vehicle 1 in the left-and-right direction with the vehicle 1 standing upright and not turned. The left grip 23 is gripped by the rider and is provided on the left of the center of the vehicle 1 in the left-and-right direction with the vehicle 1 standing upright and not turned. When dividing the vehicle 1 in the left-and-right direction of the vehicle 1 into three portions such as a right portion, a central portion and a left portion when looking at the vehicle 1 standing upright and not from the front thereof, the right grip 22 is located at the right portion, and the left grip 23 is located at the left portion.

According to a preferred embodiment of the present invention, the handlebar assembly 20 further includes a handlebar 26 and a handlebar connector 21. The handlebar 26 extends in the left-and-right direction of the vehicle 1. The right grip 22 is provided at a right end portion of the handlebar 26. The left grip 23 is provided at a left end portion of the handlebar 26.

The handlebar connector 21 connects the handlebar 26 to the steering shaft 9. The handlebar 26 is fixed to the handlebar connector 21. The handlebar connector 21 connects the handlebar 26, the upper portion of the steering shaft 9 and the top bridge 50 together.

Figure 4:
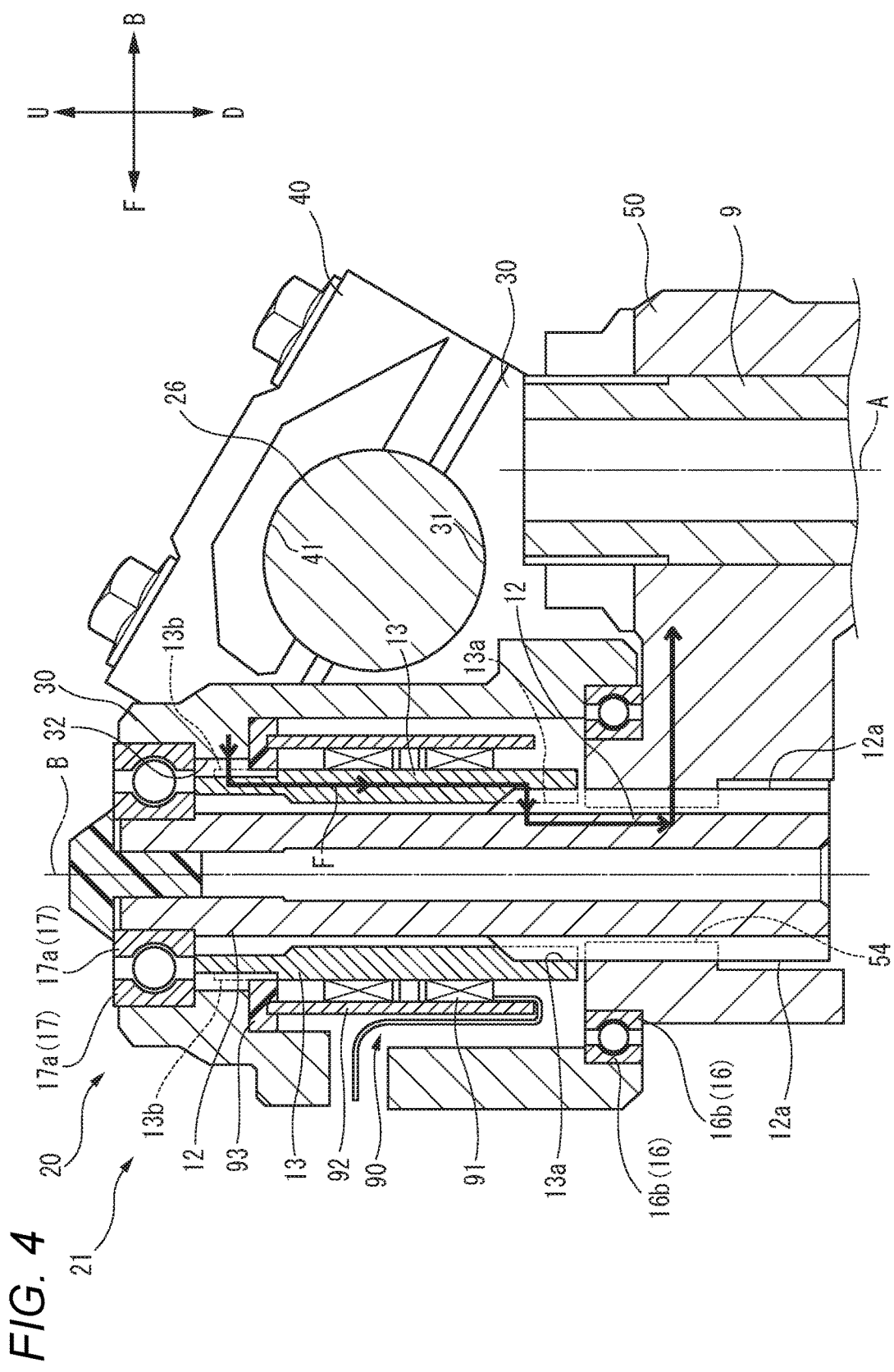
FIG. 4 is a sectional view taken along a line IV-IV in FIG. 2.

FIG. 4 is a sectional view taken along a line IV-IV in FIG. 2. As shown in FIG. 4, the handlebar connector 21 includes an upper member 40 and a lower member 30 which is provided below the upper member 40. The handlebar 26 is fixed by the upper member 40 and the lower member 30 therebetween. The handlebar connector 21 is provided above the top bridge 50.

A lower-side handlebar receiving portion 31, which is able to accommodate the handlebar 26 therein, is provided at a rear portion of the lower member 30. The upper member 40 is attached so as to face the lower-side handlebar receiving portion 31. An upper-side handlebar receiving portion 41 is provided on the upper member 40 in a position which corresponds to the lower-side handlebar receiving portion 31.

The handlebar 26 is fixed to the handlebar connector 21 by holding the handlebar 26 by the lower-side handlebar receiving portion 31 and the upper-side handlebar receiving portion 41. It should be noted that a boundary plane between the lower member 30 and the upper member 40 extends higher at a front portion than at a rear portion at the portion where the handlebar 26 is held and is inclined relative to a horizontal plane.

A front portion of the lower member 30 is preferably cylindrical in shape, and is provided with a through hole 32 penetrating it in the up-and-down direction. A first bearing 16 and a second bearing 17 are provided in an interior of the through hole 32.

The lower member 30 is supported on the top bridge 50 via the first bearing 16 so as to turn thereon. An inner race 16a of the first bearing 16 is fixed to an upper portion of the top bridge 50, and an outer race 16b of the first bearing 16 is fixed to a lower portion of the lower member 30.

An upper portion of the lower member 30 is supported on an upper portion of a shaft 12 via the second bearing 17 so as to turn thereon. An inner race 17a of the second bearing 17 is fixed to the shaft 12, and an outer race 17b of the second bearing 17 is fixed to the upper portion of the lower member 30.

According to a preferred embodiment of the present invention, the handlebar connector 21 includes the shaft 12 and an outer cylindrical member 13.

The shaft 12 and the outer cylindrical member 13 are preferably cylindrical members whose axes extend in the up-and-down direction. The shaft 12 and the outer cylindrical member 13 are provided in the interior of the through hole 32. An upper end of the shaft 12 is located above an upper end of the outer cylindrical member 13. A lower end of the shaft 12 is located below a lower end of the outer cylindrical member 13. The outer cylindrical member 13 is provided so as to cover a portion of an outer circumference of the shaft 12.

An upper portion of the shaft 12 is supported on the lower member 30 so as to turn. A middle portion of the shaft 12 in the up-and-down direction meshes with the outer cylindrical member 13. A lower portion of the shaft 12 is fixed to the top bridge 50. The shaft 12 is fixed to the top bridge 50 ahead of the steering shaft 9.

A plurality of spline grooves 12a, which extend in an axial direction, are provided on an outer circumferential surface of a lower portion of the shaft 12. The upper portion of the shaft 12 projects upwards from an upper surface of the top bridge 50. The lower portion of the shaft 12 is spline fitted in the front supporting hole 54 of the top bridge 50. The shaft 12 is fixed so as not to turn relative to the top bridge 50.

The outer cylindrical member 13 is preferably cylindrical in shape. An inner diameter of the outer cylindrical member 13 is almost equal to an outer diameter of the shaft 12, and the outer cylindrical member 13 is placed over an outer circumferential surface of the shaft 12. An upper portion of the outer cylindrical member 13 is fixed to the lower member 30. A middle portion of the outer cylindrical member 13 in the up-and-down direction meshes with the shaft 12. The outer cylindrical member 13 is not fixed to the top bridge 50. The outer cylindrical member 13 is preferably a metallic cylindrical member whose thickness is thinner than that of the shaft 12. The outer cylindrical member 13 is easier to be deformed torsionally by the steering torque input by the rider than the shaft 12. The outer cylindrical member 13 is provided at a center of the vehicle 1 in the left-and-right direction with the vehicle 1 standing upright and not turned (refer to FIG. 2). When dividing the vehicle 1 in the left-and-right direction of the vehicle 1 into three portions such as a right portion, a central portion and a left portion when looking at the vehicle 1 standing upright and not turned from the front thereof, the outer cylindrical member 13 is located at the central portion.

Figure 5:
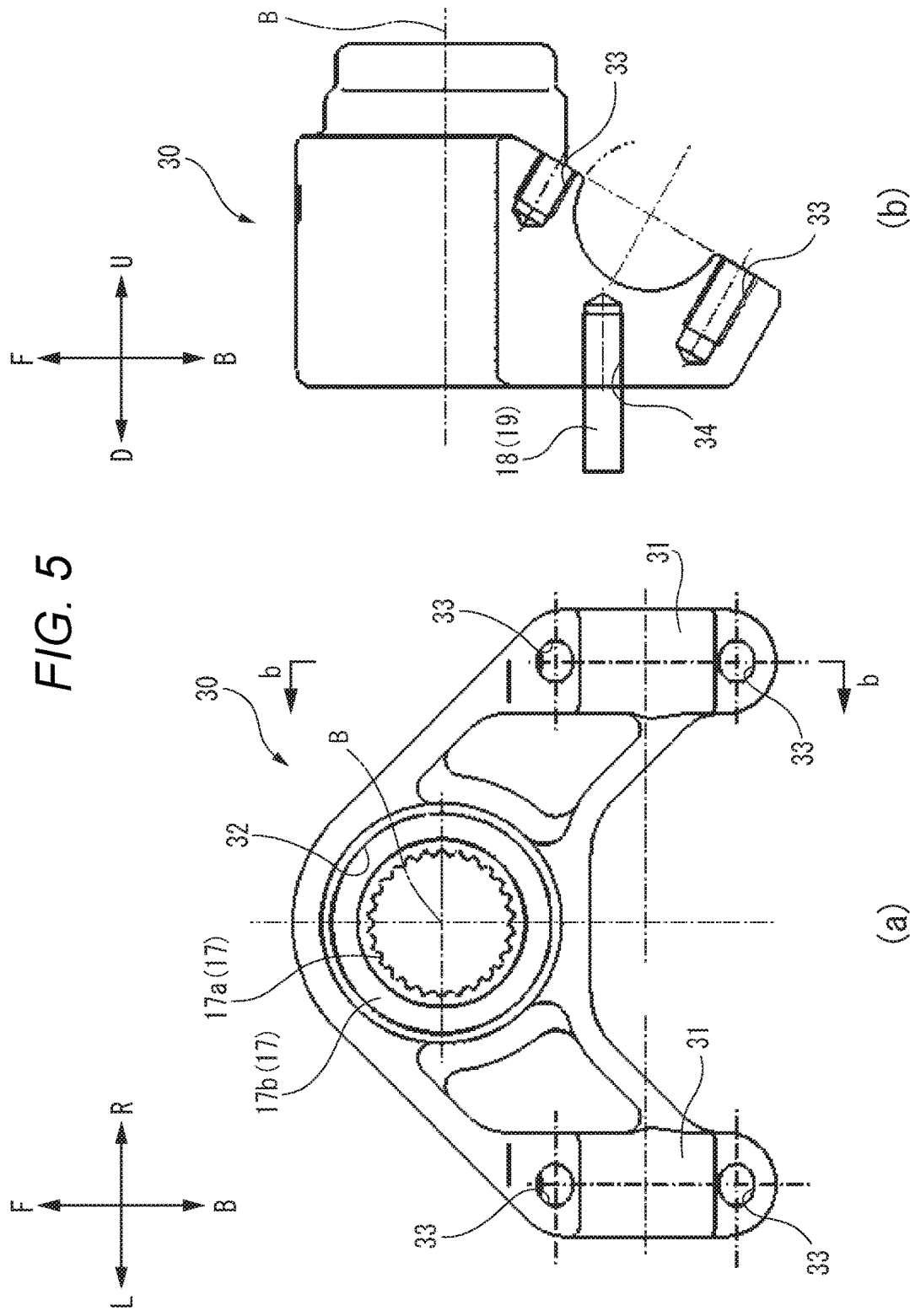
FIGS. 5A and 5B show views of a lower member of a handlebar holder.

FIGS. 5A and 5B show views of the lower member 30 of the handlebar connector 21. FIG. 5A is a top view of the lower member 30, and FIG. 5B is a sectional view of the lower member 30 taken along a line b-b in FIG. 5A. As shown in FIG. 5A, the through hole 32 is provided in the front portion of the lower member 30 so that the shaft 12 is inserted therethrough. The second bearing 17 is provided in the through hole 32. As has been described above, the shaft 12 is fixed to the inner race 17a of the second bearing 17 so as not to turn. The lower-side handlebar receiving portion 31 is provided on the left and right of the through hole 32.

A pair of first threaded holes 33 is provided in an upper surface of the lower member 30. The pair of first threaded holes 33 hold the lower-side handlebar receiving portion 31 therebetween in the front-and-rear direction. The upper member 40 is aligned with the lower member 30 so that the upper-side handlebar receiving portion 41 faces the lower-side handlebar receiving portion 31, and then, the upper member 40 is fixed to the lower member 30 by screwing screws into the first threaded holes 33.

Returning to FIG. 4, the outer cylindrical member 13 is disposed outwards of the shaft 12 and inwards of the lower member 30. A spline groove 13a is provided on an inner circumferential surface of the lower portion of the outer cylindrical member 13. The lower portion of the outer cylindrical member 13 is not fixed to the lower member 30 but is spline fitted on the outer circumferential surface of the shaft 12. A spline groove 13b is provided on an outer circumferential surface of the upper portion of the outer cylindrical member 13. The upper portion of the outer cylindrical member 13 is not fixed to the shaft 12 but is fixed to the lower member 30.

When a steering torque is applied to the lower member 30 from the handlebar 26 to turn the lower member 30 relative to the shaft 12, the outer cylindrical member 13 is twisted, such that the steering torque is transmitted to the shaft 12. Namely, the steering torque input into the handlebar 26 is transmitted to the top bridge 50 via the outer cylindrical member 13. When the steering torque is inputted thereinto, the upper portion of the outer cylindrical member 13 is deformed relative to the lower portion thereof in a turning direction about a twisting axis B which extends in an axial direction of the outer cylindrical member 13. When the steering torque is inputted thereinto, the upper portion of the outer cylindrical member 13 is twisted relative to the lower portion thereof about the twisting axis B which extends in the axial direction of the outer cylindrical member 13. The twisting axis B extends in the up-and-down direction of the vehicle 1. In the present preferred embodiment, the twisting axis B is parallel or substantially parallel to the direction of a major axis of the shaft 12. The twisting axis B is parallel or substantially parallel to a steering axis A.

It should be noted that in the present preferred embodiment, the steering torque is transmitted from the handlebar 26 to the top bridge 50 via a right assisting transmission element 18 and a left assisting transmission element 19 in addition to the outer cylindrical member 13. As shown in FIG. 5B, a pair of left and right second threaded holes 34 is provided on a lower surface of the lower member 30. The pair of left and right second threaded holes 34 are provided in locations which correspond to a left middle hole 55 and a right middle hole 56, respectively, which are provided in the top bridge 50. The left assisting transmission element 19 is screwed into the left second threaded hole 34 of the lower member 30. The right assisting transmission element 18 is screwed into the right second threaded hole 34 of the lower member 30.

Returning to FIG. 3, the left middle hole 55 is provided in the top bridge 50 in a position located between the left supporting hole 51 and the rear supporting hole 53 in relation to the left-and-right direction and ahead of the rear supporting hole 53 in relation to the front-and-rear direction. A rubber ring 57 is fitted in an inner circumferential surface of the left middle hole 55. The right middle hole 56 is provided in the top bridge 50 in a position located between the right supporting hole 52 and the rear supporting hole 53 in relation to the left-and-right direction and ahead of the rear supporting hole 53 in relation to the front-and-rear direction. A rubber ring 57 is fitted in an inner circumferential surface of the right middle hole 56.

The left assisting transmission element 19, which is fixed to the lower member 30, penetrates through the left middle hole 55 of the top bridge 50. The right assisting transmission element 18, which is fixed to the lower member 30, penetrates through the right middle hole 56 of the top bridge 50.

As shown in FIG. 3, the rubber ring 57 is provided between the left assisting transmission element 19 and the inner circumferential surface of the left middle hole 55. The rubber ring 57 is provided between the right assisting transmission element 18 and the inner circumferential surface of the right middle hole 56. When the rider applies a steering torque to the handlebar 26, the rubber ring 57 is elastically deformed after the outer cylindrical member 13 is twisted, and the left assisting transmission element 19 applies the steering torque to an inner wall of the left middle hole 55 via the rubber ring 57. Additionally, the rubber ring 57 is elastically deformed after the outer cylindrical member 13 is twisted, and the right assisting transmission element 18 applies the steering torque to an inner wall of the right middle hole 56 via the rubber ring 57.

Namely, the left assisting transmission element 19 and the right assisting transmission element 18 assist in transmitting the steering torque inputted into the handlebar 26 to the top bridge 50. In this manner, since the steering torque is not applied only to the outer cylindrical member 13, a great rigidity is not required of the outer cylindrical member 13, which significantly reduces or prevents an enlargement in the size of the outer cylindrical member 13.

As shown in FIG. 4, the vehicle 1 according to the present preferred embodiment includes a torque sensor 90 (an example of a steering torque detector) that detects at least a portion of the steering torque which is inputted into the steering torque transmission 10. In the present preferred embodiment, the torque sensor 90 is a magnetostrictive torque sensor, for example. The torque sensor 90 includes a pickup coil 91. The pickup coil 91 is provided outside the outer cylindrical member 13. The pickup coil 91 is fixed to a mounting substrate 92. This mounting substrate 92 is fixed to the lower member 30 of the handlebar connector 21 via a bush 93.

When the rider inputs a steering force into the right grip 22 and the left grip 23, a steering torque is transmitted to the handlebar 26. In FIG. 4, a line F denotes a steering torque transmission path. As indicated by the line F, when a steering torque is inputted into the handlebar 26, the steering torque acts on the handlebar connector 21. The force inputted into the lower member 30 is transmitted to the outer cylindrical member 13 via the spline groove 13b provided on the upper portion of the outer cylindrical member 13. The force is further transmitted to the shaft 12 via the spline groove 13a which is provided on the lower portion of the outer cylindrical member 13. The shaft 12 transmits the steering torque to the top bridge 50 via the spine grooves 12a and the front supporting hole 54 on which the spline grooves are provided.

The outer cylindrical member 13 is fixed to the lower member 30 at the upper portion and is fixed to the shaft 12 at the lower portion thereof. Due to this, when the steering torque is inputted into the handlebar 26, the upper portion of the outer cylindrical member 13 is deformed relative to the lower portion of the outer cylindrical member 13 in the turning direction about the twisting axis B. The upper portion of the outer cylindrical member 13 is twisted about the twisting axis B relative to the lower portion of the outer cylindrical member 13. Then, the pickup coil 91 detects a variation in the physical amount of twisting of the upper portion of the outer cylindrical member 13. In the present preferred embodiment, the pickup coil 91 detects a variation in an electric signal which is caused by the variation in the physical amount of twisting of the outer cylindrical member 13. An electric circuit connected electrically to this pickup coil 91 converts this physical amount of twisting into a value indicating a steering torque.

The twisting axis B of the outer cylindrical member 13 of the torque sensor 90 is offset ahead of the steering axis A of the steering shaft 9. Due to this, for example, even when the rider attempts to move the handlebar 26 to the left without rotating the handlebar 26, the force is applied to the shaft 12 from the outer cylindrical member 13, such that the top bridge 50 turns about the steering axis A. Namely, since the outer cylindrical member 13 is twisted even when the handlebar 26 is moved in the left-and-right direction, the torque sensor 90 is able to detect the operation.

As described above, the twisting axis B of the outer cylindrical member 13 is offset relative to the steering axis A of the steering shaft 9, and the upper end of the steering shaft 9 is located below the lower end of the shaft 12 in relation to the up-down-direction of the steering shaft 9. Because of this, compared with a case where the steering shaft 9 and the shaft 12 are aligned on the same straight line, the vehicle 1 is compact in the up-and-down direction thereof.

FIG. 6 is a sectional view taken along a line VI-VI in FIG. 2. As shown in FIG. 6, the vehicle 1 according to the present preferred embodiment includes an assisting force applicator 60 in front of the headpipe 8. The torque sensor 90, the top bridge 50 and the assisting force applicator 60 are arranged in this order from top to bottom in the up-and-down direction of the headpipe 8.

In the up-and-down direction of the headpipe 8, a lower end of the pickup coil of the torque sensor 90 is located above an upper end of the top bridge 50, and an upper end of the assisting force applicator 60 (an upper end of a housing 85 in the illustrated example) is located below a lower end of a central portion of the top bridge 50. The assisting force applicator 60 includes a motor 70 and a speed reducer 80, for example. The motor torque generated by the motor 70 is applied to the steering shaft 9 via the speed reducer 80.

The motor 70 includes an output shaft 71. The motor 70 is attached to the headpipe 8 so that the output shaft 71 becomes parallel or substantially parallel to the steering axis A. The output shaft 71 is also parallel or substantially parallel to the twisting axis B. When looking at the vehicle from the side thereof, the output shaft 71 of the motor 70 is provided ahead of the steering axis A of the steering shaft 9 in the front-and-rear diction which is at right or substantially right angles to the steering axis A of the steering shaft 9.

The speed reducer 80 includes a first gearwheel 82 and a second gearwheel 83 which are fixed to the same middle shaft 81. An axis of the middle shaft 81 of the speed reducer 80, an axis of the output shaft 71 of the motor 70, and the steering axis A are parallel or substantially parallel to one another. The first gearwheel 82 of the speed reducer 80 meshes with the output shaft 71 of the motor 70. The second gearwheel 83 of the speed reducer 80 meshes with a third gearwheel 84 which is fixed to an outer circumferential surface of the steering shaft 9.

The motor 70 and the speed reducer 80 are provided in an interior of a common housing 85. The housing 85 includes an attachment 85a at a rear portion thereof. The attachment 85a of the housing 85 is held by the top bridge 50 and the headpipe 8 therebetween.

When the motor 70 is driven to rotate the output shaft 71, the motor torque is transmitted from the output shaft 71 to the first gearwheel 82 of the speed reducer 80. When the first gearwheel 82 is rotated, the second gearwheel 83 rotates together with the first gearwheel 82. The rotation of the second gearwheel 83 is transmitted to the third gearwheel 84 of the steering shaft 9. The motor torque of the motor 70 is transmitted to the steering shaft 9 in the manner described above.

As shown in FIG. 6, the steering shaft 9 is supported by the upper bearing 24 and the lower bearing 25 which is provided below the upper bearing 24 so as to turn. The headpipe 8 supports the steering shaft 9 so as to turn via the upper bearing 24 and the lower bearing 25. An outer race of the upper bearing 24 is fixed to the housing 85 which is fixed to the body frame 2. An inner race of the upper bearing 24 is fixed to the third gearwheel 84 which is fixed to the steering shaft 9. An outer race of the lower bearing 25 is fixed to the headpipe 8. An inner race of the lower bearing 25 is fixed to the steering shaft 9.

In the present preferred embodiment, a steering torque transmission path includes, from an upstream side to a downstream side, the right grip 22 and the left grip 23, the handlebar 26, the lower member 30, the outer cylindrical member 13, the shaft 12, the top bridge 50, the steering shaft 9, the bottom bridge 14, the right suspension 7 and the left suspension 6, and the front wheel 4, in that order.

Incidentally, the steering torque transmission 10 includes the outer cylindrical member 13 (an example of a torsional deformation element) which is easy to be deformed by a steering torque inputted from the right grip 22 or the left grip 23.

In the steering torque transmission path extending from the right grip 22 or the left grip 23 to the front wheel 4, the outer cylindrical member 13 is located upstream of a portion of the steering shaft 9 which is supported by the upper bearing (an example of an upstream bearing) of the plurality of bearings 24, 25, which is the most upstream bearing.

When a steering force is inputted into the right grip 22 or the left grip 23 from the rider, the outer cylindrical member 13 is easier to be twisted than the shaft 12. When a steering force is inputted into the right grip 22 or the left grip 23 from the rider, the outer cylindrical member 13 is easier to be twisted than the lower member 30 and the handlebar 26. When a steering force is inputted into the right grip 22 or the left grip 23 from the rider, the outer cylindrical member 13 is easier to be twisted than the top bridge 50, the steering shaft 9, the bottom bridge 14, the right suspension 7 and the left suspension 6.

When a steering force is inputted into the right grip 22 or the left grip 23 from the rider, the outer cylindrical member 13 is twisted to be deformed more greatly than the other elements in the steering torque transmission path. Since the amount of torsional deformation is great, the torque sensor 90 easily detects a portion of the steering torque inputted from the right grip 22 or the left grip 23 with high accuracy.

Incidentally, the inventor has discovered that a leaning vehicle as described in Japanese Patent No. 5383388 tends to have insufficient rigidity to support the steering shaft. In a case where an element which supports the steering shaft is simply enlarged in size, although the supporting rigidity is enhanced, the size of the vehicle is enlarged. This problem will be described in detail below.

The leaning vehicle described in Japanese Patent No. 5383388 has the steering shaft which transmits a steering torque which is inputted from the right grip and the left grip to the front wheel. The handlebar which includes the right grip and the left grip is provided at an upper portion of the vehicle. The front wheel is provided at a lower portion of the vehicle. Due to this, the steering shaft extends in an up-and-down direction of the body frame.

When the rider inputs a steering force into the right grip and the left grip, the steering shaft is twisted according to a steering torque generated then. The steering sensor detects an amount of twisting generated in the steering shaft. A torsional deformation element is provided in the steering shaft, and this torsional deformation element has a lower rigidity than that of the other portions thereof so as to be twisted easier. The steering torque sensor detects an amount of deformation of the torsional deformation element.

Different from the leaning vehicle of Japanese Patent No. 5383388, in a case where the torque sensor monitors a portion of the steering shaft which has a higher rigidity so as to be deformed with difficulty, the steering torque sensor has difficulty in detecting the steering torque with high accuracy. In the event that there is a portion which has a lower rigidity in the steering torque transmission path, the portion having the lower rigidity is twisted greatly, while the portion having the higher rigidity which is monitored by the steering torque sensor has difficulty in being deformed, thus making it difficult for the steering torque sensor to detect the steering torque with high accuracy. For these reasons, with the leaning vehicle of Japanese Patent No. 5383388, steering torque is detected with high accuracy.

Incidentally, the steering shaft of the leaning vehicle of Japanese Patent No. 5383388 is supported on the headpipe with the plurality of bearings so as to turn therein. Different from the leaning vehicle of Japanese Patent No. 5383388, in the event that the steering shaft is attempted to be supported by a single bearing, a great force is applied to the bearing, and therefore, a large bearing that withstands the great force is needed.

By using the structure described above, with the leaning vehicle of Japanese Patent No. 5383388, the steering torque is detected with high accuracy while ensuring the required rigidity. However, the inventor has discovered that a vehicle as described in Japanese Patent No. 5383388 tends to have insufficient rigidity to support the steering shaft as will be described below when taking into consideration a bending force which is applied to the steering shaft.

In addition to twisting caused by the steering torque, a bending force is applied to the steering shaft. For example, when a front wheel is displaced in a front-and-rear direction, a bending force is applied to the steering shaft. When the front wheel is displaced in the front-and-rear direction, since a force acting in the front-and-rear direction is applied to a lower portion of the steering shaft, the lower portion of the steering shaft is displaced more than a portion of the steering shaft which is located above the lower portion. When a bending force is applied to the steering shaft on which a torsional deformation element is provided, although the steering shaft is bent greatly at the torsional deformation element, a portion located above the torsional deformation element is not deformed greatly.

A description will be made by taking as an example a case where the steering shaft is supported so as to turn by an upper bearing and a lower bearing which is provided below the upper bearing. Imagine a case where a bending force is applied to a lower portion of the steering shaft as described above.

In a case where the torsional deformation element that detects a steering torque is provided below a lower bearing, the bending force is concentrated on the torsional deformation element, such that the torsional deformation element is deformed greatly. Then, it is considered to increase a diameter of the torsional deformation element so as to ensure a rigidity against the bending force at the torsional deformation element. However, when the diameter of the torsional deformation element is increased, with the intent to detect the steering torque with high accuracy, the rigidity of the other portion of the steering shaft needs to be increased higher than that of the torsional deformation element. Due to this, in the event that the torsional deformation element is provided below the lower bearing, the size of the steering shaft is increased.

A different structure is considered in which the torsional deformation element is provided between the upper bearing and the lower bearing. In this structure too, however, stress is concentrated on the torsional deformation element when a bending force is applied to the steering shaft. As a result, in the steering shaft, the portion located below the torsional deformation element is deformed greater than the portion located above the torsional deformation element. Then, the bending force supported by the upper bearing which is located above the torsional deformation element is reduced, while the bending force supported by the lower bearing which is located below the torsional deformation element is increased by such an extent that the bending force supported by the upper bearing is reduced. Due to this, in order to increase the supporting rigidity of the lower bearing, the size of the lower bearing is increased, or in order to increase the rigidity of the torsional deformation element, the size of the other portion of the steering shaft is increased. This increases the size of the steering shaft as a whole.

In the description above, although the steering shaft is described as being supported by the upper bearing and the lower bearing, the same effects result even when one or more bearings are provided between the upper bearing and the lower bearing.

In the description above, although the torsional deformation element is described as being provided on the steering shaft, the problem remains the same even when the torsional deformation element is provided on the element other than the steering shaft in the steering torque transmission path. It is considered that the torsional deformation element is provided on an element located on a downstream side of the steering torque transmission path, for example, an element which connects the steering shaft and the suspensions together. Even with this structure, however, when attempting to ensure a great rigidity of the torsional deformation element which is provided on that element, in order to detect an amount of twisting thereof, the rigidity of the other element such as the steering shaft needs to be ensured, thus increasing the size of the other element.

The inventor has noticed that the size of the vehicle is increased when attempting to ensure a great supporting rigidity and to ensure a great accuracy for the steering torque sensor in which the torsional deformation element is provided halfway along the steering torque transmission path as described above.

Then, the steering torque transmission 10 according to a preferred embodiment of the present invention includes the outer cylindrical member 13 (an example of the torsional deformation element) which is easy to be deformed the steering torque inputted from the right grip 22 or the left grip 23. In the steering torque transmission path extending from the right grip 22 or the left grip 23 to the front wheel 4, the outer cylindrical member 13 is located upstream of the portion of the steering shaft 9 which is supported by the upper bearing 24 (the example of the upstream bearing) of the plurality of bearings 24, 25, that is the most upstream of the bearings. By using this structure, even though a bending force is applied to the portion of the steering torque transmission path from the side of the front wheel 4, the bending force is supported efficiently by all the bearings 24, 25, such that the enlargement in size of the vehicle 1 is significantly reduced or prevented.

In addition, even though the bending force is applied to the steering torque transmission path, since the bending force is supported by all the bearings 24, 25, it is difficult for the bending force to be applied to the outer cylindrical member 13 which is located upstream of the portion of the steering shaft 9 which is supported by the upper bearing 24 in the steering torque transmission path. This eliminates the necessity of enhancing the rigidity of the outer cylindrical member 13, and the rigidity of the other portions does not have to be increased more than required. This significantly reduces or prevents an enlargement in the size of the vehicle 1.

According to a preferred embodiment of the present invention, the outer cylindrical member 13, which functions as the torsional deformation element that is easily twisted and deformed when the steering torque is applied thereto, is provided on the handlebar assembly 20. Since the torsional deformation element may also be at least one of the group of elements of the handlebar assembly 20, the degree of freedom in designing the torsional deformation element is enhanced.

According to a preferred embodiment of the present invention, the handlebar assembly 20 includes the handlebar 26 and the handlebar connector 21 which connects the handlebar 26 to the steering shaft 9. The outer cylindrical member 13 as the torsional deformation element is provided on the handlebar connector 21.

According to a preferred embodiment of the present invention, the torque sensor 90 is provided on the handlebar assembly 20. Since the torque sensor is mounted using at least one of the group of elements of the handlebar assembly 20, the degree of freedom in disposing the torque sensor is enhanced.

According to a preferred embodiment of the present invention, the handlebar assembly 20 includes the handlebar 26 and the handlebar connector 21 which connects the handlebar 26 to the steering shaft 9. The torque sensor 90 is provided on the handlebar connector 21.

According to a preferred embodiment of the present invention, the motor 70 is provided which inputs an assisting steering torque into the steering torque transmission 10. The motor 70 assists the rider in steering or turning the front wheel 4.

According to a preferred embodiment of the present invention, the motor 70 inputs an assisting steering torque to an element in the steering torque transmission path located downstream of the portion of the steering shaft 9 which is supported by the upper bearing 24 of the plurality of bearings 24, 25, which is located most upstream in the steering torque transmission path extending from the handlebar assembly 20 to the front wheel 4. Since the torque generated by the motor 70 is applied to the portion located downstream of the outer cylindrical member 13, the torque is detected easily and with high accuracy by the torque sensor 90 which detects torque based on the torsional deformation of the outer cylindrical member 13.

According to a preferred embodiment of the present invention, for example, an electric current is supplied to the motor 70 according to an output of the torque sensor 90 to generate the motor torque so as to assist the rider in steering or turning the front wheel 4. In a preferred embodiment, the output of the torque sensor 90 assists the steering torque. However, the present invention is not limited thereto. For example, the output of the torque sensor 90 may be used for traction control, or the output of the torque sensor 90 may be used to control the ABS (Anti-lock Brake System).

As shown in FIG. 2, at least a portion of the torque sensor 90 is located on the right of the left suspension 6 and on the left of the right suspension 7 in relation to the left-and-right direction when looking at the vehicle standing upright and not turned from the front thereof. In a preferred embodiment, the entire the torque sensor 90 is located on the right of the left suspension 6 and on the left of the right suspension 7 when looking at the vehicle standing upright and not turned from the front thereof.

According to a preferred embodiment of the present invention, since the top bridge 50 connects the steering shaft 9 and the left and right suspensions 6, 7 together, there exists no such situation that the steering torque inputted into the handlebar 26 is concentrated on the steering shaft 9. This eliminates the necessity of increasing the diameter of the steering shaft 9, thus making it possible to significantly reduce or prevent an enlargement in the size of the vehicle.

The torque sensor 90 detects the steering torque inputted into the handlebar 26 based on the amount of twisting of the outer cylindrical member 13 (an example of a variation in the physical amount) which is generated by the relative displacement between the lower member 30 and the shaft 12. Namely, the torque sensor 90 detects a variation in a physical amount of twisting of the outer cylindrical member 13 which is located on the upstream side of the top bridge 50 in the steering torque transmission path from the handlebar 26 to the front wheel 4.

A portion of the steering torque transmission path from the top bridge 50 to the front wheel 4 which is located downstream of the top bridge 50 is divided into paths to the steering shaft 9, the left suspension 6 and the right suspension 7. Because of this, even though a variation in the physical amount of twisting of the elements located downstream of the top bridge 50 is detected, the steering torque inputted into the handlebar 26 cannot be detected accurately. According to the vehicle 1 of a preferred embodiment, however, the torque sensor 90 detects a variation in the physical amount of twisting of the outer cylindrical member 13 which is located upstream of the top bridge 50 in the steering torque transmission path. This enables the torque sensor 90 to detect the steering torque inputted into the handlebar 26 accurately.

Further, according to a preferred embodiment of the present invention, at least a portion of the torque sensor 90 is located on the right of the left suspension 6 and on the left of the right suspension 7 in relation to the left-and-right direction when looking at the vehicle standing upright and not turned from the front thereof. This enables the torque sensor 90 to be disposed near the steering shaft 9. When the handlebar 26 is turned, the handlebar connector 21 on which the torque sensor 90 is provided also moves together with the handlebar 26. Because of this, being different from the present preferred embodiment, in the event that the torque sensor 90 is disposed in a position located far away from the steering shaft 9, the other elements have to be disposed in positions located far away from the steering shaft 9 so that the torque sensor 90 is prevented from interfering with the other elements, which increases the size of the vehicle. According to a preferred embodiment, however, since the torque sensor 90 is disposed near the steering shaft 9, it becomes difficult for the torque sensor 90 to interfere with the other elements, thus making it possible to significantly reduce or prevent an enlargement in the size of the vehicle 1.

When the handlebar 26 is turned, the torque sensor 90 also moves together with the handlebar 26. On the other hand, the headpipe 8 does not move together with the handlebar 26 even when the handlebar 26 is turned. Because of this, there is a concern that the torque sensor 90 interferes with the headpipe 8 when the handlebar 26 is turned. Thus, an attempt to avoid the interference of the torque sensor 90 with the headpipe 8 may impose a limitation on the degree of freedom in designing the vehicle.

According to a preferred embodiment of the present invention, however, at least a portion of the torque sensor 90 is located above the lower end of the top bridge 50 which is located above the headpipe 8 when looking at the vehicle standing upright and not turned from the front thereof. This makes it difficult for the torque sensor 90 to interfere with the top bridge 50 even when the handlebar 26 is turned because the torque sensor 90 and the top bridge 50 are spaced apart from each other in relation to the up-and-down direction, thus enhancing the degree of freedom in designing the vehicle.

Second Preferred Embodiment

Figure 7:
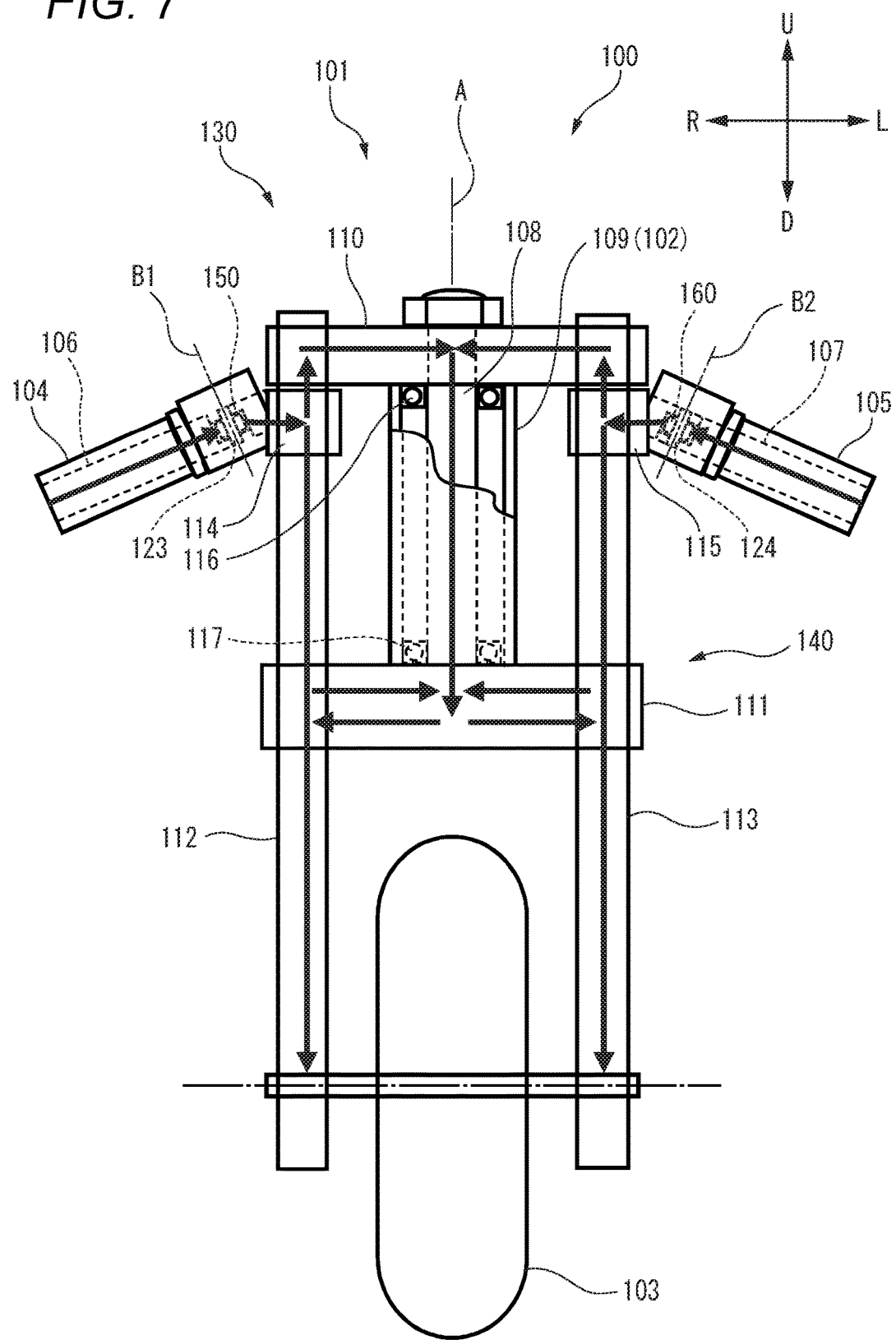
FIG. 7 is a schematic view of a leaning vehicle according to a second preferred embodiment of the present invention as seen from a front thereof.

FIG. 7 is a schematic view of a vehicle 100 according to a second preferred embodiment of the present invention as seen from a front thereof. In the vehicle 100 shown in FIG. 7, a torsional deformation element is provided on a handlebar.

The vehicle 100 includes a steering torque transmission 101, a body frame 102 including a headpipe 109, and a front wheel 103. The steering torque transmission 101 transmits the steering torque which is inputted from a rider to the front wheel 103. The steering torque transmission 101 includes a steering shaft 108, a handlebar assembly 130 and a front wheel connector 140. The steering torque transmission 101 transmits mechanically the steering torque inputted into the handlebar assembly 130 to the front wheel 103.

The handlebar assembly 130 includes a group of elements which is connected directly or indirectly to the steering shaft 108. The handlebar assembly 130 includes a right grip 104, a right handlebar 106 and a right connector 114. The handlebar assembly 130 includes a left grip 105, a left handlebar 107 and a left connector 115.

The front wheel connector 140 connects the steering shaft 108 and the front wheel 103 together. The front wheel connector 140 includes a top bridge 110, a bottom bridge 111, a right suspension 112 and a left suspension 113.

The right grip 104 is provided at a right portion of the right handlebar 106. A left portion of the right handlebar 106 is connected to an upper portion of the right suspension 112. The right connector 114 is provided at the left portion of the right handlebar 106. The right handlebar 106 is connected to the right suspension 112 via the right connector 114.

Figure 8:
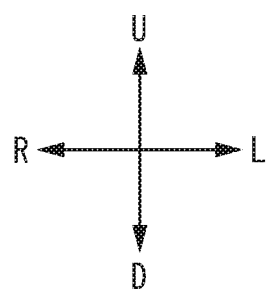
FIG. 8 is an enlarged view showing a right handlebar and a right connector.
Figure 8:
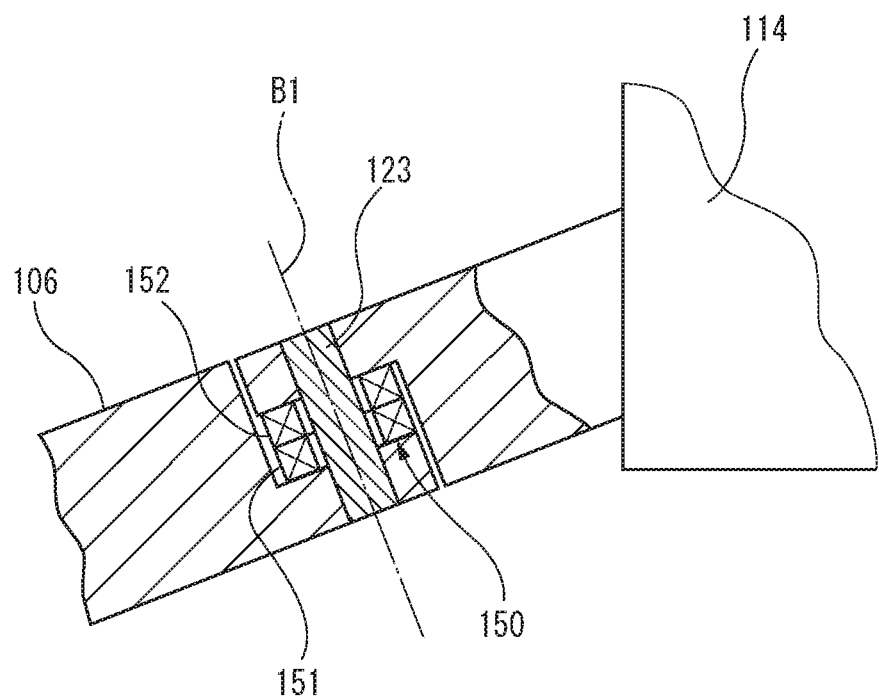

FIG. 8 is an enlarged view showing the right handlebar 106 and the right connector 114. In FIG. 8, a connector between the right handlebar 106 and the right connector 114 is partially shown in section. As shown in FIG. 8, the left portion of the right handlebar 106 and a right portion of the right connector 114 are connected together via a right middle shaft 123 (an example of a torsional deformation element). A lower portion of the right middle shaft 123 is fixed to the right handlebar 106 so as not to turn. An upper portion of the right middle shaft 123 is fixed to the right connector 114 so as not to turn. The right middle shaft 123 extends in the direction of a right twisting axis B1. The right twisting axis B1 of the right middle shaft 123 extends in the direction which is at right or substantially right angles to a direction in which the right handlebar 106 extends. The right handlebar 106 is able to be displaced about the right twisting axis B1 relative to the right connector 114. As shown in FIG. 7, when dividing the vehicle 100 into three portions such as a right portion, a central portion and a left portion in a left-and-right direction of the vehicle 100 when looking at the vehicle 100 standing upright from a front thereof, the right middle shaft 123 is located at the right portion.

As shown in FIG. 8, a right torque sensor 150 is provided on an outer circumference of the right middle shaft 123. The right torque sensor 150 is a magnetostrictive torque sensor, for example. The right torque sensor 150 includes a pickup coil 151 and a housing 152 which accommodates the pickup coil 151. The housing 152 is fixed to the right connector 114. The pickup coil 151 is provided so as to face the right middle shaft 123. The pickup coil 151 detects a variation in an electric signal according to a torsional deformation of the right middle shaft 123 about the right twisting axis B1. The right torque sensor 150 detects the steering torque which is inputted from the right grip 104 based on a torsional deformation of the right middle shaft 123. The right torque sensor 150 detects at least a portion of the steering torque which is inputted into the steering torque transmission 101 based on a torsional deformation of the right middle shaft 123.

The left grip 105 is provided at a left portion of the left handlebar 107. A right portion of the left handlebar 107 is connected to an upper portion of the left suspension 113. The left connector 115 is provided at a right portion of the left handlebar 107. The left handlebar 107 is connected to the left suspension 113 via the left connector 115.

The right portion of the left handlebar 107 and a left portion of the left connector 115 are connected together via a left middle shaft 124 (an example of the torsional deformation element). A lower portion of the left middle shaft 124 is fixed to the left handlebar 107 so as not to turn. An upper portion of the left middle shaft 124 is fixed to the left connector 115 so as not to turn. The left middle shaft 124 extends in the direction of a left twisting axis B2. The left twisting axis B2 of the left middle shaft 124 extends in the direction which is at right or substantially right angles to a direction in which the left handlebar 107 extends. The left handlebar 107 is able to be displaced about the left twisting axis B2 relative to the left connector 115. When dividing the vehicle 100 into three portions such as the right portion, the central portion and the left portion in the left-and-right direction of the vehicle 100 when looking at the vehicle 100 standing upright and not turned from the front thereof, the left middle portion 124 is located at the left portion.

A left torque sensor 160 is provided on an outer circumference of the left middle shaft 124. The structure of the left torque sensor 160 is preferably the same as that of the right torque sensor 150. The left torque sensor 160 detects a steering torque which is inputted from the left grip 105 based on a torsional deformation of the left middle shaft 124 about the left twisting axis. The left torque sensor 160 detects at least a portion of the steering torque which is inputted into the steering torque transmission 101 based on a torsional deformation of the left middle shaft 124 about the left twisting axis.

The upper portion of the right suspension 112 is fixed to a right portion of the top bridge 110. The upper portion of the right suspension 112 is connected to the right handlebar 106 below the top bridge 110. A middle portion of the right suspension 112 in an up-and-down direction thereof is fixed to the bottom bridge 111. A lower portion of the right suspension 112 rotatably supports the front wheel 103.

The upper portion of the left suspension 113 is fixed to a left portion of the top bridge 110. The upper portion of the left suspension 113 is connected to the left handlebar 107 below the top bridge 110. A middle portion of the left suspension 113 in an up-and-down direction thereof is fixed to the bottom bridge 111. A lower portion of the left suspension 113 rotatably supports the front wheel 103.

The top bridge 110 is connected to the upper portion of the right suspension 112, the upper portion of the left suspension 113 and an upper portion of the steering shaft 108. The upper portion of the right suspension 112, the upper portion of the left suspension 113 and the upper portion of the steering shaft 108 are prevented from being displaced relatively by the top bridge 110. The right portion of the top bridge 110 is connected to the right suspension 112 above the right connector 114. The left portion of the top bridge 110 is connected to the left suspension 113 above the left connector 115. A central portion of the top bridge 110 is fixed to the upper portion of the steering shaft 108.

The bottom bridge 111 is connected to the middle portion of the right suspension 112, the middle portion of the left suspension 113 and a lower portion of the steering shaft 108. The middle portion of the right suspension 112, the middle portion of the left suspension 113 and the lower portion of the steering shaft 108 are prevented from being displaced relatively by the bottom bridge 111. The bottom bridge 111 is connected to the right suspension 112 and the left suspension 113 below the top bridge 110. The bottom bridge 111 is fixed to a lower end portion of the steering shaft 108.

The steering shaft 108 is supported in the headpipe 109 so as to turn therein. The headpipe 109 is fixed to the body frame 102. The headpipe 109 is located below the top bridge 110 and above the bottom bridge 111. An upper end of the steering shaft 108 is located above an upper end of the headpipe 109. A lower end of the steering shaft 108 is located below a lower end of the headpipe 109. The steering shaft 108 is fixed to the top bridge 110 and the bottom bridge 111.

An upper bearing 116 and a lower bearing 117, which is located below the upper bearing 116, are provided in an interior of the headpipe 109. The upper bearing 116 and the lower bearing 117 support the steering shaft 108 so as to turn relative to the headpipe 109.

For example, when the rider grips the right grip 104 and the left grip 105 and pushes the right grip 104 forwards while pulling the left grip 105 backwards, the front wheel 103 is steered or turned to the left. Namely, when seen from above, the steering shaft 108 turns counterclockwise about the headpipe 109.

A steering force inputted into the right grip 104 by the rider is transmitted to the right handlebar 106. A steering torque inputted into the right handlebar 106 is transmitted to the right connector 114 via the right middle shaft 123. When the steering torque is inputted into the right handlebar 106, the lower portion of the right middle shaft 123, which is fixed to the right handlebar 106, is displaced relative to the upper portion thereof, which is fixed to the right connector 114, about the right twisting axis B1 in a turning direction. When the steering torque is inputted into the right handlebar 106, the lower portion of the right middle shaft 123 is twisted about the right twisting axis B1 relative to the upper portion thereof.

Further, the steering torque inputted into the right connector 114 is transmitted from the upper portion of the right suspension 112 to the front wheel 103 via the top bridge 110, the steering shaft 108, the bottom bridge 111, the middle portion of the right suspension 112 and the lower portion of the right suspension 112.

A steering force inputted into the left grip 105 by the rider is transmitted to the left handlebar 107. The steering torque inputted into the left handlebar 107 is transmitted to the left connector 115 via the left middle shaft 124. When the steering torque is inputted into the left handlebar 107, the left middle shaft 124 is twisted about the left twisting axis B2.

Further, the steering torque inputted into the left connector 115 is transmitted from the upper portion of the left suspension 113 to the front wheel 103 via the top bridge 110, the steering shaft 108, the bottom bridge 111, the middle portion of the left suspension 113 and the lower portion of the left suspension 113.

Namely, in the present preferred embodiment, a transmission path of the steering torque inputted from the right hand of the rider includes, from an upstream side to a downstream side, the right grip 104, the right handlebar 106, the right middle shaft 123, the right connector 114, the upper portion of the right suspension 112, the top bridge 110, the steering shaft 108, the bottom bridge 111, and the lower portion of the right suspension 112, in that order. Similarly, a transmission path of the steering torque inputted from the left hand of the rider includes, from an upstream side to a downstream side, the left grip 105, the left handlebar 107, the left middle shaft 124, the left connector 115, the upper portion of the left suspension 113, the top bridge 110, the steering shaft 108, the bottom bridge 111, and the lower portion of the left suspension 113, in that order. Of the upper bearing 116 and the lower bearing 117 which support the steering shaft 108, the upper bearing 116 is a bearing which is located most upstream.

A portion of the steering torque inputted into the right connector 114 is transmitted from the middle portion of the right suspension 112 to the front wheel 103 via the lower portion of the right suspension 112. A portion of the steering torque inputted into the left connector 115 is transmitted from the middle portion of the left suspension 113 to the front wheel 103 via the lower portion of the left suspension 113.

In the present preferred embodiment, the right middle shaft 123 and the left middle shaft 124 are provided as a torsional deformation element which is twisted and deformed easily by a steering torque which is inputted from the right grip 104 and the left grip 105 by the rider.

The right middle shaft 123, which is provided at the left portion of the right handlebar 106, is provided on the left of the right grip 104. The right middle shaft 123 is provided on the right of a center of the vehicle 100 in the left-and-right direction with the vehicle 1 standing upright and not turned.

The left middle shaft 124, which is provided at the right portion of the left handlebar 107, is provided on the left of the left grip 105. The left middle shaft 124 is provided on the left of the center of the vehicle 100 in the left-and-right direction with the vehicle 1 standing upright and not turned. The right middle shaft 123 and the left middle shaft 124 are laterally symmetrically with each other with respect to the center of the vehicle 100 in the left-and-right direction thereof.

The vehicle 100 includes the right torque sensor 150 which detects at least a portion of a steering torque inputted into the steering torque transmission based on a torsional deformation of the right middle shaft 123 and the left torque sensor 160 which detects at least a portion of the steering torque inputted into the steering torque transmission based on a torsional deformation of the left middle shaft 124. The right middle shaft 123 and the left middle shaft 124 have the lowest rigidity among the elements of the steering torque transmission 101.

In the present preferred embodiment, the steering shaft 108 is supported by the upper bearing 116 and the lower bearing 117. In the steering torque transmission path, the upper bearing 116 is located most upstream. Both the right middle shaft 123 and the left middle shaft 124 are located upstream of the upper bearing 116 which is located most upstream in the steering torque transmission path. By using this structure, even though a bending force is applied to the portion of the steering torque transmission path from the side of the front wheel 103, the bending force is supported efficiently by both of the upper bearing 116 and the lower bearing 117, such that an enlargement in the size of the vehicle 100 is significantly reduced or prevented.

In addition, even though a bending force is applied to the steering torque transmission path, since the bending force is supported by both the upper bearing 116 and the lower bearing 117, it becomes difficult for the bending force to be applied to the right middle shaft 123 and the left middle shaft 124 which are provided on the upstream side of the upper bearing 116. This eliminates the necessity of enhancing the rigidity of the right middle shaft 123 and the left middle shaft 124, and the rigidity of the other portions does not have to be increased more than required. This significantly reduces or prevents an enlargement in the size of the vehicle 100.

Third Preferred Embodiment

Figure 9:
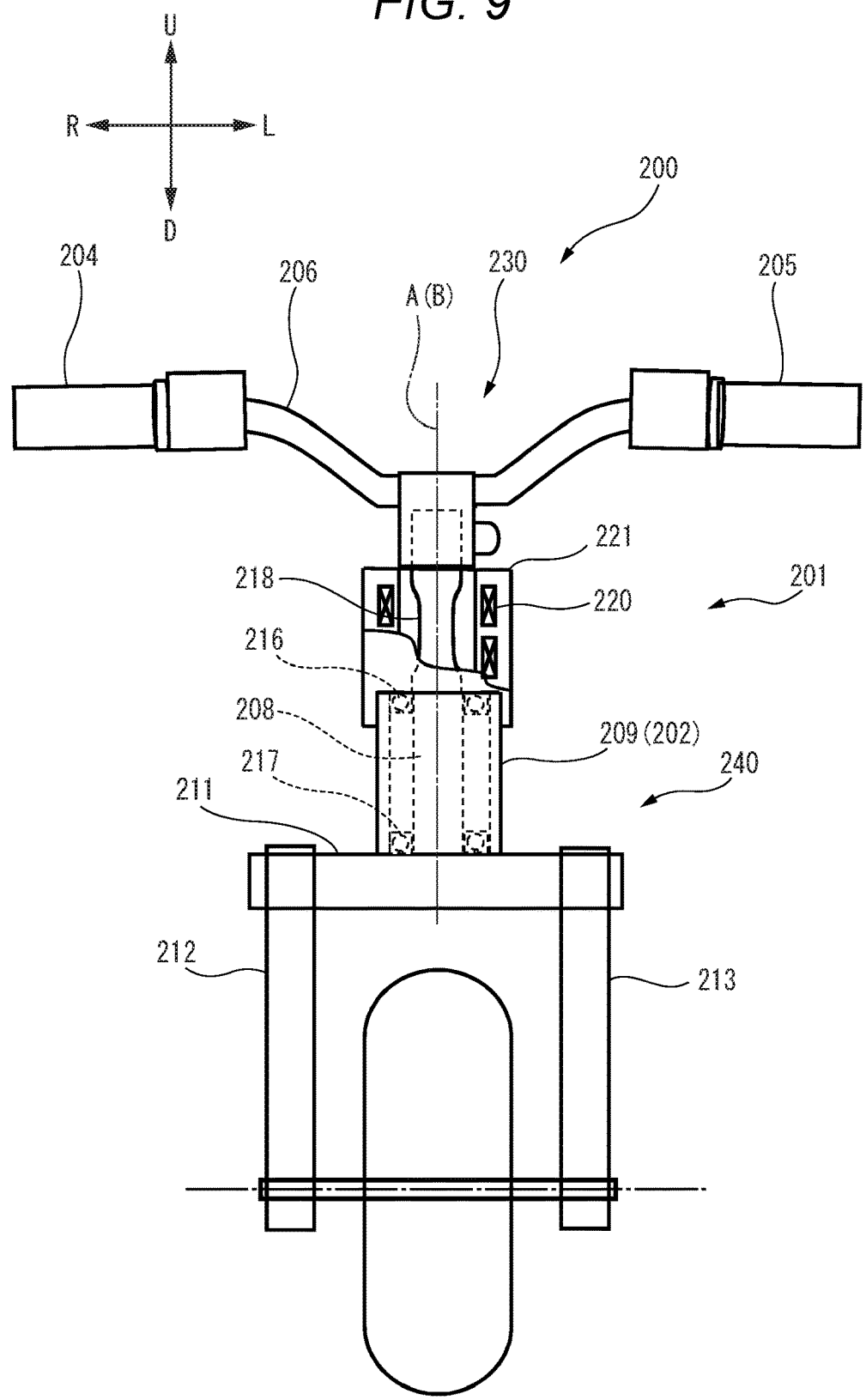
FIG. 9 is a schematic view of a leaning vehicle according to a third preferred embodiment of the present invention as seen from a front thereof.

FIG. 9 is a schematic view of a vehicle 200 according to a third preferred embodiment of the present invention as seen from a front thereof. In the vehicle 200 shown in FIG. 9, a torsional deformation element 218 is provided on a steering shaft 208.

The vehicle 200 includes a steering torque transmission 201, a body frame 202 including a headpipe 209, and a front wheel 203. The steering torque transmission 201 transmits the steering torque which is inputted from a rider to the front wheel 203. The steering torque transmission 201 includes the steering shaft 208, a handlebar assembly 230 and a front wheel connector 240. The steering torque transmission 201 transmits mechanically the steering torque inputted into the handlebar assembly 230 to the front wheel 203.

The handlebar assembly 230 is a group of elements which is connected directly or indirectly to the steering shaft 208. The handlebar assembly 230 includes a right grip 204, a left grip 205 and a handlebar 206.

A front wheel connector 240 includes a bottom bridge 211, a right suspension 212 and a left suspension 213.

The handlebar 206 is fixed to an upper portion of the steering shaft 208. The right grip 204 is provided at a right portion of the handlebar 206. The left grip 205 is provided at a left portion of the handlebar 206. A middle portion of the handlebar 206 in a left-and-right direction thereof is fixed to the steering shaft 208.

The steering shaft 208 is supported in the headpipe 209 so as to turn therein. The headpipe 209 is fixed to the body frame 202. The headpipe 209 is located above the bottom bridge 211. An upper end of the steering shaft 208 is located above an upper end of the headpipe 209. A lower end of the steering shaft 208 is located below a lower end of the headpipe 209. A lower portion of the steering shaft 208 is fixed to the bottom bridge 211.

An upper bearing 216 and a lower bearing 217 which are located below the upper bearing 216 are provided in the headpipe 209. The upper bearing 216 and the lower bearing 217 support the steering shaft 208 so as to turn relative to the headpipe 209.

A right portion of the bottom bridge 211 is fixed to an upper portion of the right suspension 212. A left portion of the bottom bridge 211 is fixed to an upper portion of the left suspension 213. A middle portion of the bottom bridge 211 in a left-and-right direction thereof is fixed to the lower portion of the steering shaft 208. The upper portion of the right suspension 212, the upper portion of the left suspension 213 and the lower portion of the steering shaft 208 are prevented from being displaced relatively by the bottom bridge 211. A lower portion of the right suspension 212 and a lower portion of the left suspension 213 rotatably support the front wheel 203.

For example, when the rider grips the right grip 204 and the left grip 205 and pushes the right grip 204 forwards while pulling the left grip 205 backwards, the handlebar 206 turns counterclockwise when seen from above, such that the front wheel 203 is steered to the left. Namely, when seen from above, the steering shaft 208 turns counterclockwise about the headpipe 209.

A steering force which is inputted into the right grip 204 and the left grip 205 by the rider is transmitted to the right suspension 212 and the left suspension 213 via the handlebar 206, the steering shaft 208 and the bottom bridge 211, such that the front wheel 203 is steered.

Namely, in the present preferred embodiment, a steering torque transmission path includes, from an upstream side to a downstream side, the right grip 204 and the left grip 205, the handlebar 206, the steering shaft 208, the bottom bridge 211, the right suspension 212 and the left suspension 213, and the front wheel 203, in that order. Of the upper bearing 216 and the lower bearing 217 which support the steering shaft 208, the bearing which is located most upstream in the steering torque transmission path is the upper bearing 216.

In the present preferred embodiment, the torsional deformation element 218 is provided at the upper portion of the steering shaft 208. The torsional deformation element 218 is able to be deformed in a turning direction about a twisting axis B. The torsional deformation element 218 is able to be twisted and deformed about the twisting axis B. The twisting axis B is coaxial with a steering axis A of the steering shaft 208.

An upper portion of the torsional deformation element 218 is fixed to the handlebar 206. A lower portion of the torsional deformation element 218 is supported by the upper bearing 216. When the rider displaces the right grip 204 and the left grip 205 to turn the handlebar 206, the torsional deformation element 218 is twisted. When dividing the vehicle 200 into three portions such as a right portion, a central portion and a left portion when looking at the vehicle 200 standing upright and not turned from the front thereof, the torsional deformation element 218 preferably is located at the central portion.

The torsional deformation element 218 has the lowest rigidity among the entire the steering shaft 208 so as to be easily twisted. The torsional deformation element 218 may be, for example, a portion having a smallest diameter in the steering shaft 208 or a portion having a rectangular or substantially rectangular cross section which tends to have lower rigidity than that of a portion having a circular or substantially circular cross section. The torsional deformation element 218 is easier to be twisted and deformed by a steering torque than the handlebar 206, the bottom bridge 211, the right suspension 212 and the left suspension 213 of the elements in the steering torque transmission path.

The vehicle 200 includes a steering torque detector 220 which detects a variation in a physical amount of twisting based on a torsional deformation of the torsional deformation element 218. The steering torque detector 220 is able to detect an amount of twisting of the torsional deformation element 218.

In the present preferred embodiment, the steering torque detector 220 includes, for example, a magnetostrictive sensor including a sensor coil. The steering torque detector 220 faces the torsional deformation element 218. A cylindrical housing 221 to which the sensor coil is fixed faces the torsional deformation element 218. The housing 221 is provided above the headpipe 209. The housing 221 is provided below the handlebar 206. The housing 221 is fixed to the body frame 202. The housing 221 is provided above the upper bearing 216.

In the present preferred embodiment, the steering shaft 208 is supported by the upper bearing 216 and the lower bearing 217. In the steering torque transmission path, the bearing which is located most upstream is the upper bearing 216. The torsional deformation element 218 is provided on an upstream side of the upper bearing 216 which is located most upstream in the steering torque transmission path. By using this structure, even though a bending force is applied to the portion of the steering torque transmission path from the side of the front wheel 203, the bending force is supported efficiently by both of the upper bearing 216 and the lower bearing 217, such that an enlargement in the size of the vehicle 200 is significantly reduced or prevented.

In addition, even though a bending force is applied to the steering torque transmission path, since the bending force is supported by both the upper bearing 216 and the lower bearing 217, it becomes difficult for the bending force to be applied to the torsional deformation element 218 which is provided on the upstream side of the upper bearing 216. This eliminates the necessity of enhancing the rigidity of the torsional deformation element 218, and the rigidity of the other portions does not have to be increased more than required. This significantly reduces or prevents an enlargement in the size of the vehicle 200.

In the present preferred embodiment, the steering torque detector 220 is provided on the headpipe 209 of the body frame 202. The torsional deformation element 218 is displaced relative to the body frame 202. Because of this, it is easy to ensure a sufficient variation of twisting in the torsional deformation element 218 as seen from the body frame 202, thus enabling the steering torque detector 220 to easily detect a variation in the physical amount of twisting based on a torsional deformation of the torsional deformation element 218. In addition, since the body frame 202 has a relatively high rigidity, the steering torque detector 220 is easily fixed to the body frame 202 with a high supporting rigidity. This enables the steering torque to be detected with high accuracy.

In the preferred embodiments that have been described heretofore, the present invention is described as being applied to a motorcycle, for example. However, preferred embodiments of the present invention can also be applied to leaning vehicles including a three-wheeled vehicle including two front wheels and a rear wheel, a three-wheeled vehicle including a front wheel and two rear wheels and a four-wheeled vehicle including two front wheels and two rear wheels, for example.

For example, preferred embodiments of the present invention can also be applied to a vehicle including a parallelogram type link mechanism which supports a right front wheel and a left front wheel so as to be displaced relative to a body frame in an up-and-down direction thereof. In this vehicle, a pitman arm which is fixed to the steering shaft so as to turn together with the steering shaft and a tie rod which connects the pitman arm and the right front wheel and the left front wheel together correspond to a front wheel connector which connects a steering shaft and the front wheels together.

Additionally, preferred embodiments of the present invention can also be applied to a vehicle including a double wishbone type link mechanism which supports a right front wheel and a left front wheel so as to be displaced relative to a body frame in an up-and-down direction thereof. In this vehicle, too, a pitman arm which is fixed to a steering shaft so as to turn together with the steering shaft and a tie rod which connects the pitman arm and the right front wheel and the left front wheel together correspond to a front wheel connector which connects the steering shaft and the front wheels together.

In the first preferred embodiment, when looking at the vehicle standing upright and not turned from the front thereof, the entire torque sensor 90 is located on the right of the left suspension 6 and on the left of the right suspension 7 and also above the lower end of the top bridge 50 which is located above the headpipe 8. However, the present invention is not limited thereto. When looking at the vehicle standing upright and not turned from the front thereof, at least a portion of the torque sensor may be located on the right of the left suspension and on the left of the right suspension in relation to the left-and-right direction and also above the lower end of the top bridge which is located above the headpipe.

In the first preferred embodiment and the third preferred embodiment, the vehicle 1 is described as including the straight bar-type handlebar 26. However, the present invention is not limited thereto. For example, a curved handlebar, a handlebar which is divided at a center in a left-and-right direction thereof, and the like may be used.

In preferred embodiments of the present invention, the torsional deformation is preferably a deformation involving a displacement in a circumferential direction of an axis which is generated when a torque acting about the axis in inputted. The torsional deformation is preferably a deformation involving a displacement in a circumferential direction of an axis which is generated by a steering torque which is inputted from the right grip or the left grip. The axis of torsional deformation may be expressed differently as a twisting axis. The torsional deformation preferably includes (A) an elastic deformation of a portion of one element in the circumferential direction of the axis. The elastic deformation in the circumferential direction of the twisting axis is a deformation involving a displacement in the circumferential direction of the axis. In this case, it is possible to adjust the elastic deformation in the circumferential direction of the axis relative to the steering torque by adjusting a relationship between the rigidity of the portion of the one element and the rigidity of other elements. The torsional deformation may include (B) a deformation in which two components deflect relatively in terms of position in the circumferential direction of the axis. In this case, it is possible to adjust the relative positional deflection in the circumferential direction of the axis relative to the steering torque by providing an elastic member such as a spring in the circumferential direction of the axis between the two components.

It should be noted that it is preferable to use a torsional deformation (A) in which a portion of one element is elastically deformed in the circumferential direction of the axis. The steering torque detector which is described in the first preferred embodiment to the third preferred embodiment detects a steering torque based on the torsional deformation described as (A) above. Because of this, the first preferred embodiment to the third preferred embodiment are more preferable embodiments.

In the first preferred embodiment, the second preferred embodiment and the third preferred embodiment, the torque sensor 90 is described as being a magnetostrictive torque sensor. However, the present invention is not limited thereto. Sensors may be used which detect a variation in the physical amount of twisting based on a relative displacement between the lower member 30 and the shaft 12, and the sensors include, for example, a strain sensor which detects a strain in the outer cylindrical member 13 and an encoder which detects a relative turning amount between the lower member 30 and the shaft 12.

As the steering torque detector, for example, a torque sensor may be used which is described in WO2014-042267. When using this torque sensor, a structure described below may be used. As this occurs, a torque sensor detects a steering torque based on the torsional deformation described as (B) above.

A sensor mount on which the torque sensor is mounted is in the steering torque transmission path. The sensor mount includes an upstream portion and a downstream portion which turn about a twisting axis, and a connecting coil spring which connects the upstream portion and the downstream portion together. One end portion of the connecting coil spring is fixed to the upstream portion and the other end portion thereof is fixed to the downstream portion. The connecting coil spring transmits a turning torque of the upstream portion to the downstream portion.

The torque sensor is mounted on the sensor mount. The torque sensor includes a ring-shaped permanent magnet which is mounted on either the upstream portion or the downstream portion, an induction ring which is mounted on the other of the upstream portion or the downstream portion, and a magnetism detector. The ring-shaped permanent magnet and the induction ring are disposed concentrically with the twisting axis.

The ring-shaped permanent magnet is disposed such that magnetic poles which are magnetized in the direction of the twisting axis are reversed alternately in a circumferential direction. The magnetic poles each have a certain circumferential width.

The induction ring includes a plurality of projections and a ring main body. The projections each have a circumferential width. The circumferential width of at least one of the projections is smaller than the circumferential width of at least one of the magnetic poles of the permanent magnet. The ring main body is concentric with the twisting axis. In the ring main body, the intensity of magnetization changes according to the positions of the projections in relation to the positions of the magnetic poles of the permanent magnet.

The magnetism detector detects a magnetic flux of the ring main body.

When a steering torque inputted from a grip is applied to the upstream portion, the connecting coil spring is elastically deformed. This changes the positions of the upstream portion and the downstream portion about the twisting axis. This positional change defines a torsional deformation. The steering torque is transmitted from the upstream portion to the downstream portion. In this structure, the upstream portion, the connecting coil spring and the downstream portion define a torsional deformation element.

When the upstream portion is displaced about the twisting axis relative to the downstream portion, the intensity of magnetization of the ring main body changes according to the amount of displacement of the upstream portion relative to the downstream portion. The magnetism detector detects a magnetic flux of the ring main body and outputs an electric signal which corresponds to an amount of positional deviation of the upstream portion relative to the downstream portion about the twisting axis in a turning direction. Namely, the magnetism detector detects at least a portion of the steering torque inputted into the steering torque transmission based on the torsional deformation of the upstream portion relative to the downstream portion.

It should be noted that the expression reading, "the turning axis A follows the up-and-down direction of the vehicle 1" includes a case where the turning axis A is parallel or substantially parallel to the up-and-down direction of the vehicle 1 and also a case where an angle at which the turning axis A intersects the up-and-down direction of the vehicle 1 is less than about 45 degrees, for example.

It should be noted that the preferred embodiments of the present invention may include the following structures.

A straddle-type vehicle which can turn with a body frame leaning and includes the body frame; a front wheel; a left suspension which is provided on a left of the front wheel to support the front wheel rotatably with the vehicle standing upright; a right suspension which is provided on a right of the front wheel to support the front wheel rotatably with the vehicle standing upright; a headpipe which is connected to the body frame; a steering shaft which is supported in the headpipe so as to turn therein; a top bridge which connects an upper portion of the left suspension, an upper portion of the right suspension and an upper portion of the steering shaft together so as not to turn relatively; a handlebar into which steering torque is inputted by a rider; a transmission element which transmits a steering torque inputted into the handlebar to the top bridge; and a sensor which detects a steering torque inputted into the handlebar, wherein the transmission element includes a first portion which is provided on the handlebar or an element which turns as the handlebar turns; and a second portion which is provided on the top bridge or an element which turns as the top bridge turns and which is able to be displaced, when a steering torque is inputted into the handlebar, relative to the first portion according to the inputted steering torque, wherein the sensor detects the steering torque which is inputted into the handlebar by detecting a variation in the physical amount of twisting based on a relative displacement between the first portion and the second portion of the transmission element which transmits the steering torque inputted into the handlebar to the top bridge, and wherein at least a portion of the sensor is located on a right of the left suspension and on a left of the right suspension and is located above a lower end of the top bridge which is located above the headpipe when looking at the vehicle standing upright and not turned from a front thereof.

A straddle-type vehicle according to a preferred embodiment of the present invention described above, includes a motor and an assisting force applicator including a speed reducer which transmits a rotation of the motor to the steering shaft to apply torque to the steering shaft, and in the straddle-type vehicle, in an up-and-down direction of the headpipe, a lower end of the sensor is located above an upper end of the top bridge, and an upper end of the assisting force applicator is located below a lower end of a central portion of the top bridge.

In a straddle-type vehicle according to a preferred embodiment of the present invention described above, an output shaft of the motor is provided ahead of a turning axis of the steering shaft in a front-and-rear direction which is at right or substantially right angles to the turning axis of the steering shaft when looking at the vehicle from a side thereof.

In a straddle-type vehicle according to a preferred embodiment of the present invention described above, the assisting force applicator includes a housing in an interior of which the motor and the speed reducer are provided, and at least a portion of the housing is fixed in place between the top bridge and the headpipe.

In a straddle-type vehicle according to a preferred embodiment of the present invention described above, the speed reducer includes at least one gearwheel, and the turning axis of the steering shaft, a rotational axis of the motor and a rotational axis of the gearwheel of the speed reducer are parallel or substantially parallel to one another.

In a straddle-type vehicle according to a preferred embodiment of the present invention described above, either of the first portion and the second portion is a shaft, while the other of the first portion and the second portion is a cylindrical portion through which the shaft is inserted and which is able to turn around the shaft, a center axis of the shaft is offset relative to the turning axis of the steering shaft, and an upper end of the steering shaft is located above a lower end of the shaft in relation to an up-and-down direction of the steering shaft.

In a straddle-type vehicle according to a preferred embodiment of the present invention described above, the sensor includes a metallic cylindrical detected body through which the shaft is inserted and which is fixed to the shaft at an axial end and is fixed to the cylindrical member at the other axial end thereof, and a pickup coil which is provided on an outer circumference of the cylindrical portion and which detects twisting of the detected body.

According to preferred embodiments of the present invention, leaning vehicles are provided which include a steering torque sensor having a high supporting rigidity against bending and which are significantly reduced or prevented from being enlarged in size.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A leaning vehicle comprising:
   a body frame including a headpipe provided at a center of the vehicle in a left-and-right direction and which leans right in the left-and-right direction when the vehicle turns right and leans left in the left-and-right direction when the vehicle turns left;
   a front wheel suspended on the body frame and that is able to be turned in the left-and-right direction;
   a steering torque transmission including a handlebar assembly and a front wheel connector that mechanically transmit a steering torque applied to the handlebar assembly to the front wheel, the handlebar assembly including:
   a steering shaft supported on the headpipe via a plurality of bearings so as to turn within a rotational angle range smaller than 180 degrees but not within a rotational angle range equal to or greater than 180 degrees, the steering shaft including a turning axis provided at a center of the vehicle in the left-and-right direction and extending along an up-and-down direction of the vehicle;
   a right grip provided to the right of the center of the vehicle in the left-and-right direction and that a rider grips; and
   a left grip provided to the left of the center of the vehicle in the left-and-right direction and that the rider grips; wherein
   the front wheel connector connects the steering shaft and the front wheel together; and
   a steering torque detector that detects at least a portion of a steering torque which is input into the steering torque transmission; wherein
   the steering torque transmission includes a torsional deformation element located upstream of a portion of the steering shaft supported by a most upstream bearing of the plurality of bearings in a steering torque transmission path that extends from the right grip or the left grip to the front wheel, the torsional deformation element being able to be twisted and deformed by a steering torque input from the right grip or the left grip; and
   the steering torque detector detects at least a portion of the steering torque input into the steering torque transmission based on a torsional deformation of the torsional deformation element.

2. The leaning vehicle according to claim 1, wherein the torsional deformation element is provided on the handlebar assembly.

3. The leaning vehicle according to claim 2, wherein the handlebar assembly includes a handlebar and a handlebar connector that connects the handlebar to the steering shaft or to the front wheel connector; and
   the torsional deformation element is provided on the handlebar.

4. The leaning vehicle according to claim 2, wherein the handlebar assembly includes a handlebar and a handlebar connector which connects the handlebar to the steering shaft or to the front wheel connector; and
   the torsional deformation element is provided on the handlebar connector.

5. The leaning vehicle according to claim 1, wherein the torsional deformation element is provided on the steering shaft.

6. The leaning vehicle according to claim 1, wherein the steering torque detector is provided on the handlebar assembly.

7. The leaning vehicle according to claim 1, wherein the handlebar assembly includes a handlebar and a handlebar connector that connects the handlebar to the steering shaft or to the front wheel connector; and
   the steering torque detector is provided on the handlebar.

8. The leaning vehicle according to claim 1, wherein the handlebar assembly includes a handlebar and a handlebar connector that connects the handlebar to the steering shaft or to the front wheel connector; and
   the steering torque detector is provided on the handlebar connector.

9. The leaning vehicle according to claim 1, wherein the steering torque detector is provided on the body frame.

10. The leaning vehicle according to claim 1, further comprising a motor that inputs an assisting steering torque to the steering torque transmission.

11. The leaning vehicle according to claim 10, wherein the motor inputs the assisting steering torque to an element in the steering torque transmission path located downstream of a portion of the steering shaft which is supported by the upstream bearing which is most upstream of the plurality of bearings in the steering torque transmission path.

* * * * *